US007568778B2

(12) United States Patent
Terada et al.

(10) Patent No.: US 7,568,778 B2

(45) Date of Patent: Aug. 4, 2009

(54) IMAGE FORMING APPARATUS

(75) Inventors: Kohei Terada, Nagoya (JP); Kazushige Muroi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 676 days.

(21) Appl. No.: 11/277,509

(22) Filed: Mar. 26, 2006

(65) Prior Publication Data

US 2006/0222433 A1 Oct. 5, 2006

(30) Foreign Application Priority Data

Mar. 30, 2005 (JP) ............................. 2005-099253

(51) Int. Cl.

| | |
|---|---|
| ***B41J 29/38*** | (2006.01) |
| ***B41J 29/393*** | (2006.01) |
| ***B41J 11/00*** | (2006.01) |
| ***G05B 11/01*** | (2006.01) |
| ***H02P 3/00*** | (2006.01) |

(52) U.S. Cl. ........................... 347/16; 347/19; 347/104; 318/560; 318/280

(58) Field of Classification Search ..................... 347/5, 347/9, 14, 16, 19, 101, 10; 318/560, 568.16, 318/280, 282, 602, 362, 366

See application file for complete search history.

(56) References Cited

U.S. PATENT DOCUMENTS

| | | | | |
|---|---|---|---|---|
| 6,599,043 | B2 | 7/2003 | Kobayashi et al. | |
| 6,702,492 | B2 | 3/2004 | Saito | |
| 6,756,760 | B2 * | 6/2004 | Tanaka et al. | 318/560 |
| 6,838,855 | B2 | 1/2005 | Kobayashi et al. | |
| 7,063,400 | B2 * | 6/2006 | Du et al. | 347/9 |
| 7,103,442 | B2 * | 9/2006 | Fukushi et al. | 700/170 |
| 7,176,649 | B2 * | 2/2007 | Shoji et al. | 318/626 |

FOREIGN PATENT DOCUMENTS

| | | |
|---|---|---|
| EP | 2004 079760 | 9/2004 |
| JP | 2002 137469 | 5/2002 |
| JP | 2002 128313 | 9/2002 |
| JP | 2002 345277 | 11/2002 |
| JP | 2004 289139 | 10/2004 |

* cited by examiner

*Primary Examiner*—Stephen D Meier
*Assistant Examiner*—Rene Garcia, Jr.
(74) *Attorney, Agent, or Firm*—Baker Botts L.L.P.

(57) ABSTRACT

An image forming apparatus including: (a) a feed mechanism including a motor and a feeder moved by the motor for feeding a medium; (b) a recording head for ejecting an ink toward the medium to form an image; (c) a feed controller for controlling the motor so as to move the feeder to a target operating position that causes the medium to be positioned in a desired position; and (d) an ink ejection controller for causing ink ejection portions of the recording head to eject the ink toward the medium. The feed controller includes: a target-operating-position changer for changing the target operating position as an original target operating position to a modified target operating position in which influence of a cyclic variation of an operation velocity of the feeder is smaller than in the original target operating position. The ink ejection controller includes: an ink-ejection portion shifter for shifting the ink ejection portions in upstream or downstream direction in which the desired position is shifted as a result of change of the target operating position.

19 Claims, 12 Drawing Sheets

IMAGE FORMING APPARATUS

This application is based on Japanese Patent Application No. 2005-099253 filed in Mar. 30, 2005, the content of which is incorporated hereinto by reference.

BACKGROUND OF THE INVENTION

1. Field of the Invention

The present invention relates to an image forming apparatus including: a feed mechanism including a motor that is to be driven with supply of a power thereto, and a feeder that is to be moved by the motor for feeding a medium in a feed direction; a recording head operable to eject an ink toward the medium so as to form an image on the medium; a feed controller operable to control the motor so as to move the feeder to a target operating position that causes the medium to be positioned in a desired recording position; and an ink ejection controller operable to cause at least one ink ejection portion of the recording head to eject the ink therethrough toward the medium.

2. Discussion of Related Art

As a kind of image forming apparatus, there is known an inkjet printer of serial type including: (a) a feed mechanism including a motor that is to be driven with supply of a power thereto, and a feed roller that is to be rotated by the motor for feeding a medium in a feed direction; (b) a recording head operable to eject an ink toward the medium so as to form an image on the medium; (c) a carriage carrying the recording head; (d) a carriage driver operable to move the carriage in a main scanning direction perpendicular to the feed direction; (e) a feed controller operable, upon reception of a command requesting the medium to be fed to a desired recording position, to control the motor so as to move the feeder to a target operating position that causes the medium to be positioned in the desired recording position; and (f) an ink ejection controller operable, upon positioning of the medium in the desired recording position, to cause at least one ink ejection portion of the recording head to eject the ink therethrough toward the medium. The feed controller is operated to control the motor so as to intermittently move the feeder while the recording head forms the image on the medium, so as to position the medium in the desired recording position by each of successive feed motions of the feeder. The ink ejection controller is operated, based on data representative of the image to be formed, to cause the at least one ink ejection portion of the recording head to eject the ink therethrough while the carriage is being moved by the carriage driver in the main scanning direction after each of the successive feed motions of the medium.

In the above-described inkjet printer in which the recording medium has to be positioned in the desired recording position by each of the successive feed motions of the feed roller, if the recording medium is positioned by each feed motion in a position deviated from the desired recording position, white-colored or dark-colored extraneous lines are likely to appear on the formed image, resulting in poor quality of the image. For preventing such an undesirable appearance of the lines, in the inkjet printer, commonly, the feed roller is controlled by detecting or monitoring an operating angular position of the feed roller (i.e., position of the recording medium) through an operating angular position detector such as a rotary encoder in each of the successive feed motions of the feed roller.

Conventionally, when the recording medium is to be moved to a certain desired position, the motor is once accelerated and then gradually decelerated such that a rotational velocity of the feed roller is reduced to a sufficiently low value in proximity of the desired position. Then, supply of electric power to the motor is stopped at a point of time at which an actual position of the moved recording medium reaches a motor OFF position that is located before the desired position by a certain amount, so that the feed roller is rotated by inertia for a while and then eventually stopped, as shown in FIG. 12A.

In this arrangement for positioning the recording medium in the desired position, as long as the rotational velocity of the feed roller at the motor OFF position is constantly controlled to be a predetermined value, an amount a of the inertial rotation of the feed roller can be held constant, whereby the feed roller can be stopped in a target operating position that causes the recording medium to be positioned in the desired position. However, due to a torque fluctuation of the feed mechanism (including the motor, feed roller, and power transmission member connecting the motor to the feed roller), if the rotational velocity of the feed roller at the motor OFF position is made lower than the predetermined value, as indicated by broken line in FIG. 12A, the amount a of the inertial rotation of the feed roller after the stop of the power supply to the motor is reduced, whereby the feed roller is likely to be stopped before the target operating position.

Commonly, the above-described motor driving the feed roller is provided by a DC motor. Due to its constructional character, a torque of the DC motor is fluctuated rather than being constant during each one rotation of a drive shaft thereof. That is, the DC motor has a so-called “cogging” by which the torque is cyclically fluctuated. Consequently, the rotation of the feed roller is affected by the cyclic fluctuation of the torque of the DC motor (see FIG. 12B).

Where a reduction in the torque of the DC motor due to the cyclic fluctuation of the torque is caused in vicinity of the motor OFF position, the amount $\alpha$ of rotation of the feed roller after the stop of the power supply to the motor until the stop of rotation of the feed roller is reduced, thereby making it impossible to stop the feed roller in the target operating position, failing to position the recording medium in the desired position.

For preventing such a problem, there is an arrangement, as disclosed in U.S. Pat. No. 6,702,492 (corresponding to JP-2002-128313A), in which a minimum controllable operating amount of the feed roller is adapted to be integer number of times as large as a cycle length of the cogging of the motor, such that the amount $\alpha$ of the inertial rotation of the feed roller after the stop of the power supply to the motor until the stop of rotation of the feed roller is constantly held in a predetermined amount. In the disclosed arrangement, a gear ratio between the motor and the feed roller is set to be an amount that causes the minimum controllable operating amount of the feed roller to be integer number of times as large as the cycle length of the cogging.

However, in the above-described arrangement, it is not possible to finely adjust control parameters representative of a relationship between the rotation amount of the motor and the feed amount of the recording medium, for accurately control the feed amount of the recording medium in presence of some erroneous variations in dimensions of the feed mechanism such as a diameter of the roller feeder and dimensions of gears, belt or other components constituting the feed mechanism. Thus, the arrangement has a problem that the components of the feed mechanism are required to have extremely high dimensional accuracy, increasing a cost required therefor.

SUMMARY OF THE INVENTION

It is therefore a first object of the invention to provide an image forming apparatus capable of forming a clear image on a medium without appearance of white or dark-colored lines thereon, by accurately positioning the medium in a desired recording position even in presence of a cyclic torque fluctuation of a feed mechanism of the apparatus, without necessity of fixing dimensions of components constituting the feed mechanism. It is a second object of the invention to provide a method of forming an image on a medium by using the image forming apparatus. The first object may be achieved according to any one of first through seventh aspects of the invention that are described below. The second object may be achieved according to an eighth aspect of the invention that is described below.

The first aspect of the invention provides an image forming apparatus including: (a) a feed mechanism including a motor that is to be driven with supply of a power thereto, and a feeder that is to be moved by the motor for feeding a medium in a feed direction; (b) a recording head operable to eject an ink toward the medium so as to form an image on the medium; (c) a feed controller operable, upon reception of a command requesting the medium to be fed to a desired recording position, to control the motor so as to move the feeder to a target operating position that causes the medium to be positioned in the desired recording position; and (d) an ink ejection controller operable, upon positioning of the medium in the desired recording position, to cause at least one ink ejection portion of the recording head to eject the ink therethrough toward the medium. The feed controller includes a target-operating-position changer operable, upon reception of the command, to change the target operating position as an original target operating position to a modified target operating position in which influence of a cyclic variation of an operation velocity of the feeder upon the positioning of the medium is smaller than in the original target operating position, the cyclic variation being caused by a torque fluctuation of the feed mechanism. The ink ejection controller includes an ink-ejection portion shifter operable, when the target operating position is changed, to shift the at least one ink ejection portion in one of upstream and downstream directions in which the desired recording position is shifted as a result of change of the target operating position, for avoiding a position of the at least one ink ejection portion relative to the medium from being changed by the change of the target operating position.

In the present image forming apparatus, the target-operating-position changer of the feed controller is operated, upon the command requesting the medium to be fed to the desired recording position, to change the original target operating position to the modified target operating position in which the position of the medium is less influenced by the cyclic variation of the operation velocity of the feeder than in the original target operating position. The ink-ejection portion shifter of the ink ejection controller is operated, when the target operating position is changed, to shift the at least one ink ejection portion in the upstream or downstream direction in which the desired recording position is shifted as a result of change of the target operating position, for avoiding the position of the at least one ink ejection portion relative to the medium from being changed by the change of the target operating position. Thus, in the present image forming apparatus, the medium can be accurately positioned in the desired recording position (i.e., a desired position relative to the at least one ink ejection portion of the recording head), so that a clear image can be formed on the medium, without the conventional necessity of fixing dimensions of components constituting the feed mechanism.

According to the second aspect of the invention, in the image forming apparatus in the first aspect of the invention, the feed controller further includes an accurate-positioning failure anticipator operable, upon reception of the command, to anticipate whether the medium fails to be accurately positioned in the desired recording position, based on the original target operating position of the feeder and the cyclic variation of the operating velocity of the feeder. The target-operating-position changer is operated, when failure of accurate positioning of the medium is anticipated by the accurate-positioning failure anticipator, to change the original target operating position to the modified target operating position.

According to the third aspect of the invention, in the image forming apparatus in the second aspect of the invention, the feed controller includes a cyclic-variation-related data storage storing data representative of a most-deviated-velocity operating position of the feeder in which the operating velocity of the feeder is most deviated from a reference value thereof within each one cycle of the cyclic variation. The accurate-positioning failure anticipator anticipates whether the medium fails to be accurately positioned in the desired recording position, based on a positional difference between the original target operating position and the most-deviated-velocity operating position of the feeder that is indicated by the data stored in the cyclic-variation-related data storage.

According to the fourth aspect of the invention, in the image forming apparatus in the second or third aspect of the invention, the feed controller includes a power supply controller operable, upon reception of the command, to supply the power to the motor until an actual operating position of the feeder coincides with a power-supply-stop operating position located before the target operating position, and to stop the supply of the power to the motor when the actual operating position coincides with the power-supply-stop operating position, for causing the actual operating position to eventually coincide with the target operating position owing to an inertia of the feed mechanism. The accurate-positioning failure anticipator anticipates whether the medium fails to be accurately positioned in the desired recording position, based on a positional difference between the power-supply-stop operating position and a most-deviated-velocity operating position of the feeder in which the operating velocity of the feeder is most deviated from a reference value thereof within each one cycle of the cyclic variation, the accurate-positioning failure anticipator anticipating that the medium fails to be accurately positioned in the desired recording position, where the positional difference is not larger than a threshold value. The target-operating-position changer is operated, when the failure of accurate positioning of the medium is anticipated, to change the power-supply-stop operating position as an original power-supply-stop operating position to a modified power-supply-stop operating position. The target-operating-position changer includes a modified power-supply-stop operating-position determiner operable to determine the modified power-supply-stop operating position, such that a positional difference between the modified power-supply-stop operating position and the most-deviated-velocity operating position is larger than the positional difference between the original power-supply-stop operating position and the most-deviated-velocity operating position, or more preferably, such that the positional difference between the modified power-supply-stop operating position and the most-deviated-velocity operating position is at least twice as large as the threshold value.

According to the fifth aspect of the invention, in the image forming apparatus in any one the first through fourth aspects of the invention, the recording head has a plurality of ink ejection nozzles which are arranged in at least one row each extending substantially in parallel with the feed direction and which are spaced apart from each other by a spacing pitch in a direction of the at least one row. The ink ejection controller is operated to assign at least one of the ink ejection nozzles as the at least one ink ejection portion to eject the ink therethrough toward the medium. The target-operating-position changer is operated to change the target operating position as the original target operating position to the modified target operating position that is distant by an amount corresponding to a shift distance that is integer number of times as large as the spacing pitch, for shifting the desired recording position in the one of the upstream and downstream directions by the shift distance. The ink-ejection portion shifter is operated, when the target operating position is changed, to shift the at least one ink ejection portion in the one of the upstream and downstream directions, by replacing each of the at least one of the ink ejection nozzles with another of the ink ejection nozzles that is distant from the each of the at least one of the ink ejection nozzles by the shift distance.

In the image forming apparatus according to the fifth aspect of the invention, the ink-ejection portion shifter shifts the at least one ink ejection portion in the upstream or downstream direction, by replacing each ink ejection nozzle with another ink ejection nozzle. However, for shifting the at least one ink ejection portion, the replacement of each ink ejection nozzle with another is not essential, as long as there is provided means for avoiding the position of the at least one ink ejection portion relative to the medium from being changed by the change of the target operating position. For example, the apparatus may include a device operable to move the recording head relative to the medium in the same direction in which the desired recording position is shifted (by the change of the target operating position), by the same distance by which the desired recording position is shifted.

According to the sixth aspect of the invention, in the image forming apparatus in any one the first through fifth aspects of the invention, there are further provided a carriage carrying the recording head; and a carriage driver operable to move the carriage in a main scanning direction perpendicular to the feed direction. The feed controller is operated to control the motor so as to intermittently move the feeder while the recording head forms the image on the medium, so as to position the medium in the desired recording position by each of successive feed motions by the feeder. The ink ejection controller is operated to cause the at least one ink ejection portion of the recording head to eject the ink therethrough while the carriage is being moved by the carriage driver in the main scanning direction after each of the successive feed motions of the medium.

According to the seventh aspect of the invention, in the image forming apparatus in any one the first through sixth aspects of the invention, there is further provided a most-deviated-velocity operating-position obtainer operable, upon power-on of the image forming apparatus, to command the power supply controller to supply the power to the motor until the feeder is operated by an operating amount corresponding to at least one cycle of the cyclic variation, and to detect the operating velocity of the feeder in a plurality of operating positions of the feeder while the feeder is being operated by the operating amount. The most-deviated-velocity operating-position obtainer obtains, based on the detected operating velocity in each of the plurality of operating positions, a most-deviated-velocity operating position of the feeder in which the operating velocity of the feeder is most deviated from a reference value thereof within each one cycle of the cyclic variation.

The cycle length of the cyclic variation and the most-deviated-velocity operating position of the feeder may be stored in the above-described cyclic-variation-related data storage or other data storage, for example, before shipment of the image forming apparatus from the factory. However, where the most-deviated-velocity operating position is represented by data defining a distance of the most-deviated-velocity operating position from a reference operating position of the feeder, the accurate-positioning failure anticipator cannot make the above-described determination or anticipation (whether the medium fails to be accurately positioned in the desired recording position or not), based on such data defining the distance of the most-deviated-velocity operating position from the reference operating position, if the data is lost by power off of the image forming apparatus, or if the feeder is moved manually during the power off of the apparatus.

In the image forming apparatus according to the seventh aspect of the invention, since there is provided the most-deviated-velocity operating-position obtainer that is operated to obtain the most-deviated-velocity operating position of the feeder, each time the image forming apparatus is newly powered on, it is possible to always obtain a positional relationship between the most-deviated-velocity operating position and the reference operating position of the feeder, even if the positional relationship is lost by power off of the apparatus, or even if the feeder is moved manually during the power off of the apparatus.

The eighth aspect of the invention provides a method of forming an image on a medium, by using a an image forming apparatus including: (a) a feed mechanism including a motor that is to be driven with supply of a power thereto, and a feeder that is to be moved by the motor for feeding a medium in a feed direction; (b) a recording head operable to eject an ink toward the medium so as to form an image on the medium; (c) a feed controller operable, upon reception of a command requesting the medium to be fed to a desired recording position, to control the motor so as to move the feeder to a target operating position that causes the medium to be positioned in the desired recording position; and (d) an ink ejection controller operable, upon positioning of the medium in the desired recording position, to cause at least one ink ejection portion of the recording head to eject the ink therethrough toward the medium. The method includes: changing the target operating position as an original target operating position to a modified target operating position in which influence of a cyclic variation of an operation velocity of the feeder upon the positioning of the medium is smaller than in the original target operating position, the cyclic variation being caused by a torque fluctuation of the feed mechanism; and shifting the at least one ink ejection portion in one of upstream and downstream directions in which the desired recording position is shifted as a result of change of the target operating position, for avoiding a position of the at least one ink ejection portion relative to the medium from being changed by the change of the target operating position.

According to the present image forming method, the medium can be accurately positioned in the desired recording position, so that a clear image can be formed on the medium, without the conventional necessity of fixing dimensions of components constituting the feed mechanism.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which.

DETAILED DESCRIPTION OF THE PREFERRED EMBODIMENTS

Figure 1:
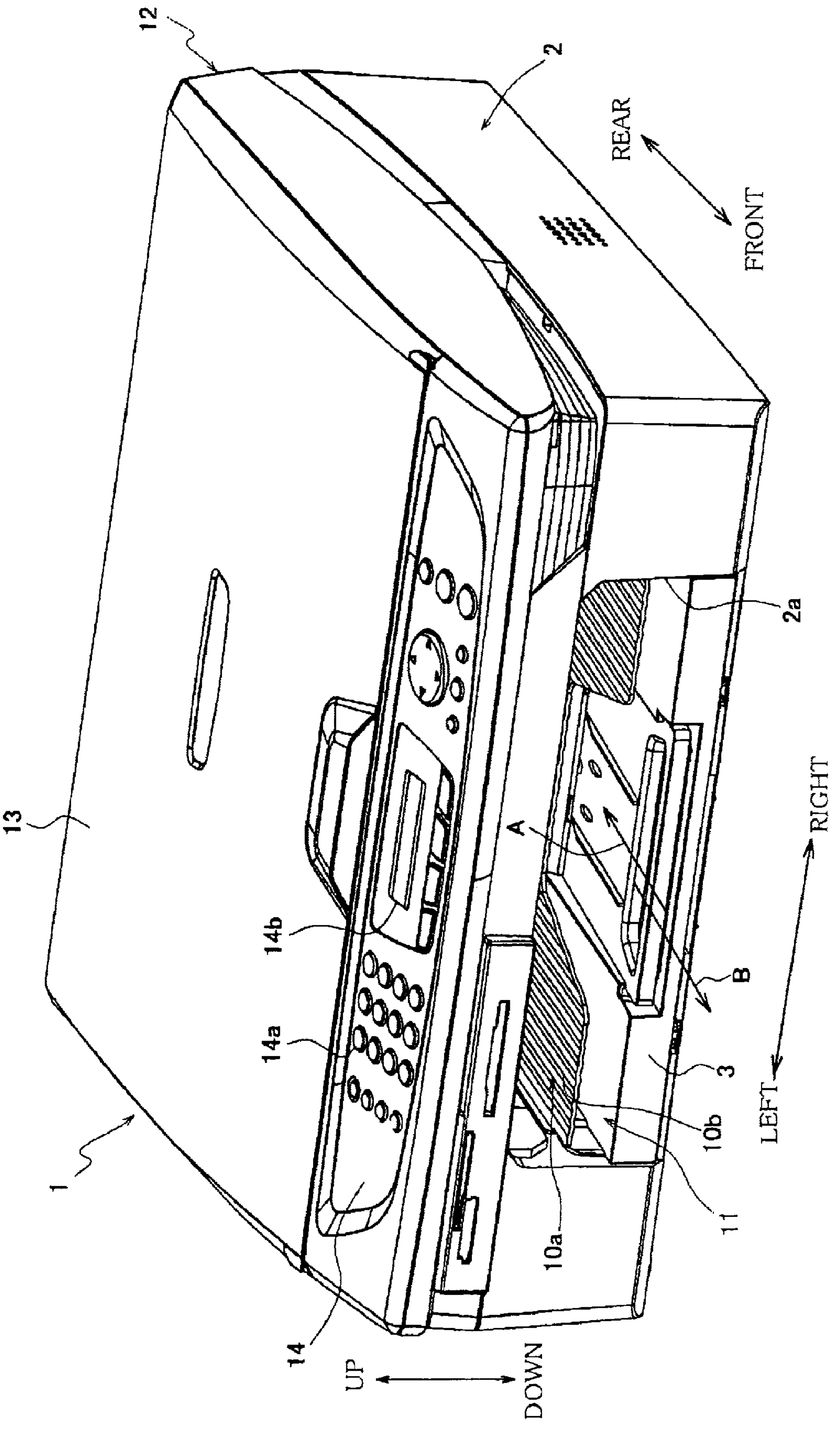
FIG. 1 is a perspective view of a multi function device constructed according to an embodiment of the invention.
Figure 2:
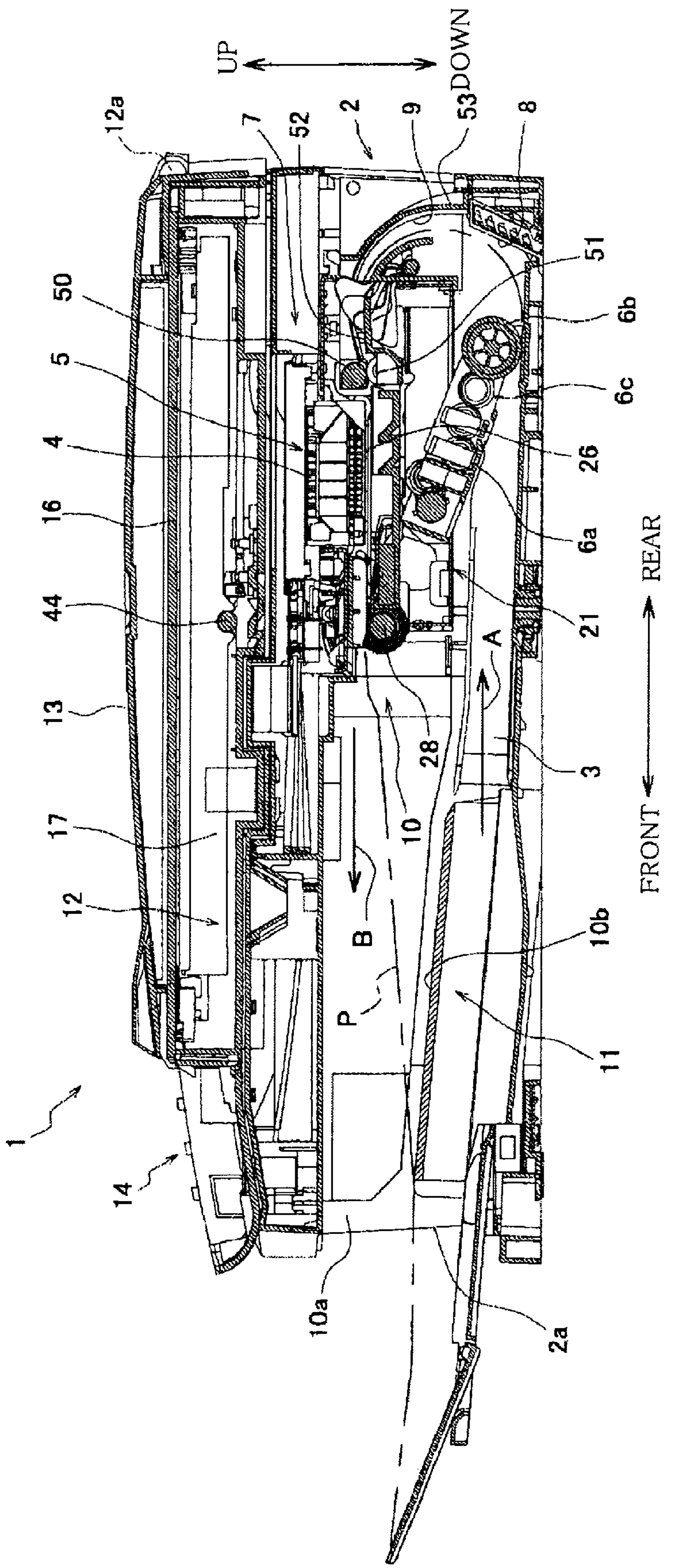
FIG. 2 is a side view in cross section of the multi function device of FIG. 1.

FIGS. 1 and 2 show an image forming apparatus in the form of a multi function device (MFD) 1 which has a printing function, a copying function, a scanning function and a facsimile function. The multi function device 1 has a housing 2 as a main body of the MFD 1. The housing 2 is formed, by injection, of a synthetic resin.

On an upper portion of the housing 2, there is disposed an image reading device 12 operable to read an original or manuscript, for achieving the copying and facsimile functions of the MFD 1. The image reading device 12 is arranged to be pivotable upwardly and downwardly about one end of the housing 2 via a hinge (not shown). An original (manuscript) covering member 13 covering an upper surface of the image reading device 12 is pivotally connected at its rear end to a rear end of the image reading device 12 through a pivot shaft 12*a* (see FIG. 2) such that the original covering member 13 is pivotable upwardly and downwardly about the pivot shaft 12*a*.

Further, on the upper surface of the image reading device 12, there is provided a glass plate 16 on which the original or manuscript is to be placed, with the original covering member 13 being opened. Below the grass plate 16, an image scanning device (CIS: contact image sensor) 17 for reading the image on the original is provided so as to be reciprocably movable along a guide rod 44 that extends in a direction perpendicular to a sheet plane of FIG. 2 (i.e., a main scanning direction corresponding to rightward and leftward directions indicated in FIG. 1).

An operation panel 14 is provided in front of the image reading device 12. The operation panel 14 includes various operating keys 14*a* that are operable by a user to input various commands, and a liquid crystal display (LCD) 14*b* that displays various information.

In a bottom portion of the housing 2, there is provided a sheet supplying portion 11 for supplying a recording sheet P as a recording medium or object. The sheet supplying portion 11 includes a sheet cassette 3, which is detachably attached to the housing 2 via an opening 2*a* formed in a front portion of the housing 2, by moving the sheet cassette 3 relative to the housing 2 in the rearward direction. In the present embodiment, the sheet cassette 3 has a construction permitting a plurality of recording sheets P (such as A4-size sheets, legal-size sheets, letter-size sheets, or postcard-size sheets) to be accommodated in the cassette 3 such that the recording sheets P are stacked on each other with short sides of the respective recording sheets P extending in a direction (i.e., the main scanning direction corresponding to the rightward and leftward directions) perpendicular to a sheet-supply direction indicated by arrow A (i.e., a sub-scanning direction corresponding to frontward and rearward directions).

As shown in FIG. 2, the sheet cassette 3 has a slant sheet-separate plate 8 provided by its rear end portion. The sheet-separate plate 8 is convexed in the forward direction, so as to have a convexly curved shape as a whole in its plan view. That is, a central portion of the sheet-separate plate 8 as seen in a widthwise direction of each recording sheet P (i.e., the rightward and leftward directions) swells in the forward direction, while opposite end portions of the plate 8 do not swell. A corrugated-shaped elastic pad is attached to the central portion of the sheet-separate plate 8, so that each recording sheet P is brought into contact at its leading end with the corrugated-shaped elastic pad, whereby separation of each sheet P from the other sheets P is facilitated.

In the sheet supplying portion 11, a sheet supply arm 6*a* is provided to supply each recording sheet P from the sheet cassette 3. The sheet supply arm 6*a* is connected at its upper end portion to the housing 2, so as to be pivotable upward and downward. A sheet supply roller Gb is rotatably supported by a lower end portion of the arm Ga, and is driven or rotated by a LF (line feed) motor 54 (see FIG. 5) via a gear train 6*c* that is provided in the arm Ga. The sheet supply roller 6*b* cooperates with the above-described corrugated-shaped elastic pad of the sheet-separate plate 8 to separate and feed, one by one, the recording sheets P stacked in the sheet cassette 3, so that each separated sheet P is fed in a sheet supply direction indicated by arrow A. Thus, the separated recording sheet P is fed to a recording portion 7 via a sheet feed path 9 which is provided by a gap defined between first and second path defining member 53, 52 and which includes a generally U-shaped portion extending horizontally. The recording portion 7 is located in a position higher than the sheet cassette 3.

Figure 3:
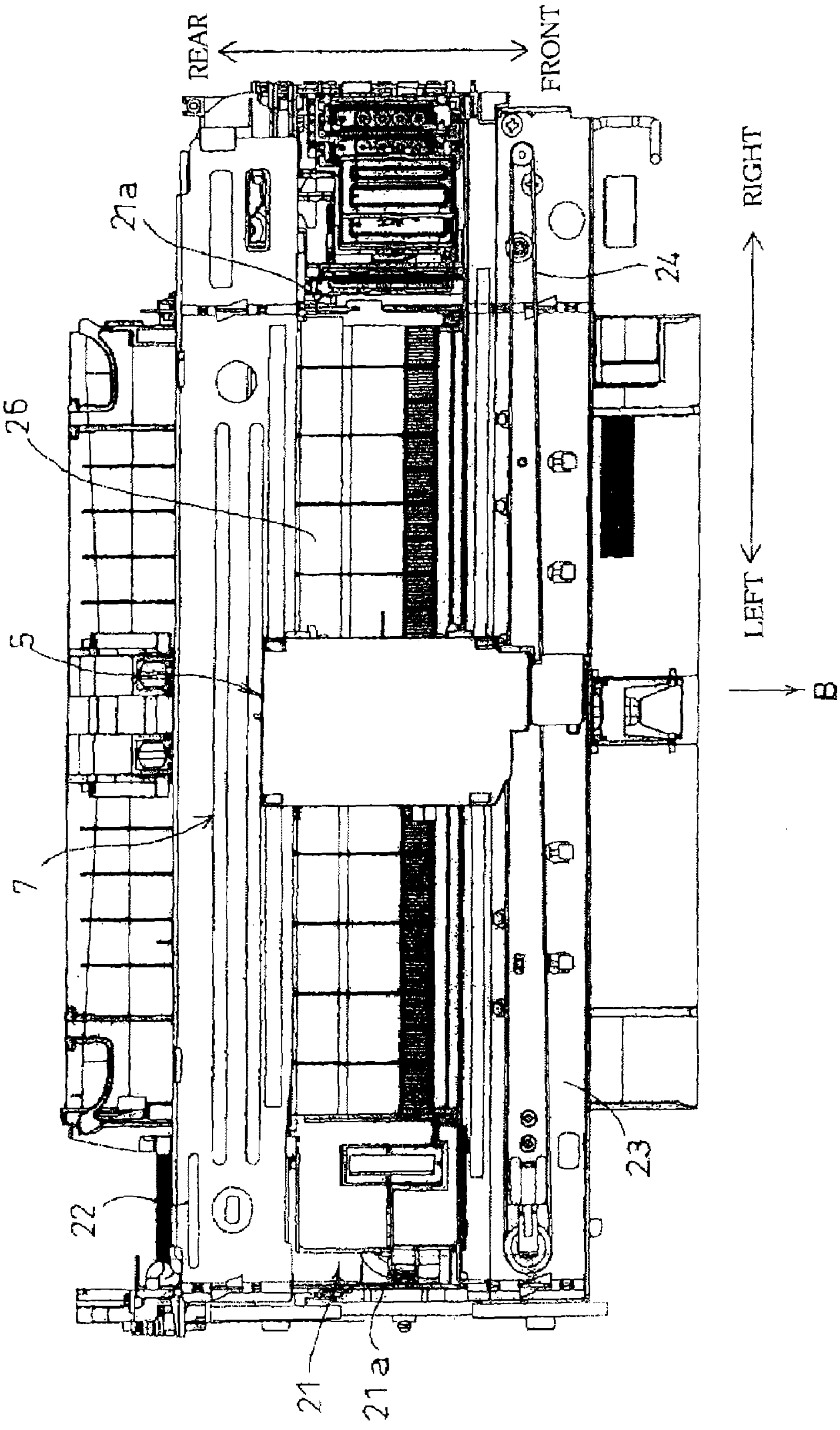
FIG. 3 is an upper plan view showing a part of the multi function device of FIG. 1, in absence of an image reading device.

FIG. 3 is a plan view of the MFD 1 in absence of the image reading device 12. As shown in FIG. 3, the recording portion 7 is located between a main frame 21 provided by a box-like member opening upward, and first and second elongated plate-like guide members 22, 23 which are respectively supported by two side walls of the main frame 21 and which extend in the main scanning direction. The recording device 7 includes an inkjet-type recording head 4 (see FIG. 2) operable to eject an ink droplet from its lower surface so as to form an image on the recording sheet P, and a carriage 5 carrying the recording head 4.

The carriage 5 is arranged to bridge between the first guide member 22 and the second guide member 23 that is located on a downstream side of the first guide member 22 as viewed in a sheet discharge direction indicated by arrow B, such that the carriage 5 is slideable on the two guide members 22, 23 and accordingly is reciprocably movable in the main scanning direction. A timing belt 24 is provided on an upper surface of the second guide member 23, and is arranged to extend in the main scanning direction and is driven or circulated to reciprocate the carriage 5. A carriage (CR) motor (not shown) is fixed to a lower surface of the second guide member 23, and is operable to drive or circulate the timing belt 24.

In the recording portion 7, a flat platen 26 is fixed to the main frame 21 and is located between the two guide members 22, 23. The platen 26 is elongated in the main scanning direction, and is opposed to the lower surface of the recording head 4 that is carried by the carriage 5.

As shown in FIG. 2, a sheet feed roller 50 and a nip roller 51 are provided on an upstream side of the platen 26 in the sheet-discharge direction B, and cooperate with each other to pinch and feed the recording sheet P toward a space below the lower surface of the recording head 4. The nip roller 51 is opposed to the sheet feed roller 50, and is biased toward the feed roller 50. On a downstream side of the platen 26 as viewed in the sheet discharge direction B, there are provided a discharge roller 28 and rowels or toothed wheels (not shown) that are opposed to the discharge roller 28 and are biased toward the roller 28. The discharge roller 28 is driven or rotated so as to cooperate with the rowels to feed the recording sheet P that has passed through the recording portion 7, toward a sheet discharging portion 10 in the sheet discharge direction B.

The sheet discharging portion 10 discharges the recording sheet P having the image that is formed on its upper surface by the recording portion 7. The sheet discharging portion 10 is provided above the sheet supplying portion 11, and includes a sheet discharge opening 10*a* that opens, together with the above-described opening 2*a*, in the front surface of the housing 2. The recording sheets P discharged from the sheet discharging portion 10 in the sheet discharge direction B are stacked on a sheet discharge tray 10*b* that is located inside of the opening 2*a*.

In a right-hand front end portion of the housing 2 that is located below the image reading device 12, there is provided an ink storage portion (not shown) for accommodating four ink cartridges that store respective four color inks (i.e., black (Bk), cyan (C), magenta (M), and yellow (Y) inks), for enabling the recording head 4 to perform a full-color printing operation. Each of the four ink cartridges can be attached and detached to and from the ink storage portion, with the image reading device 12 being opened upward. The four ink cartridges are connected to the recording head 4 via respective four flexible ink supply tubes (not shown), so as to supply the inks to the recording head 4.

Figure 4:
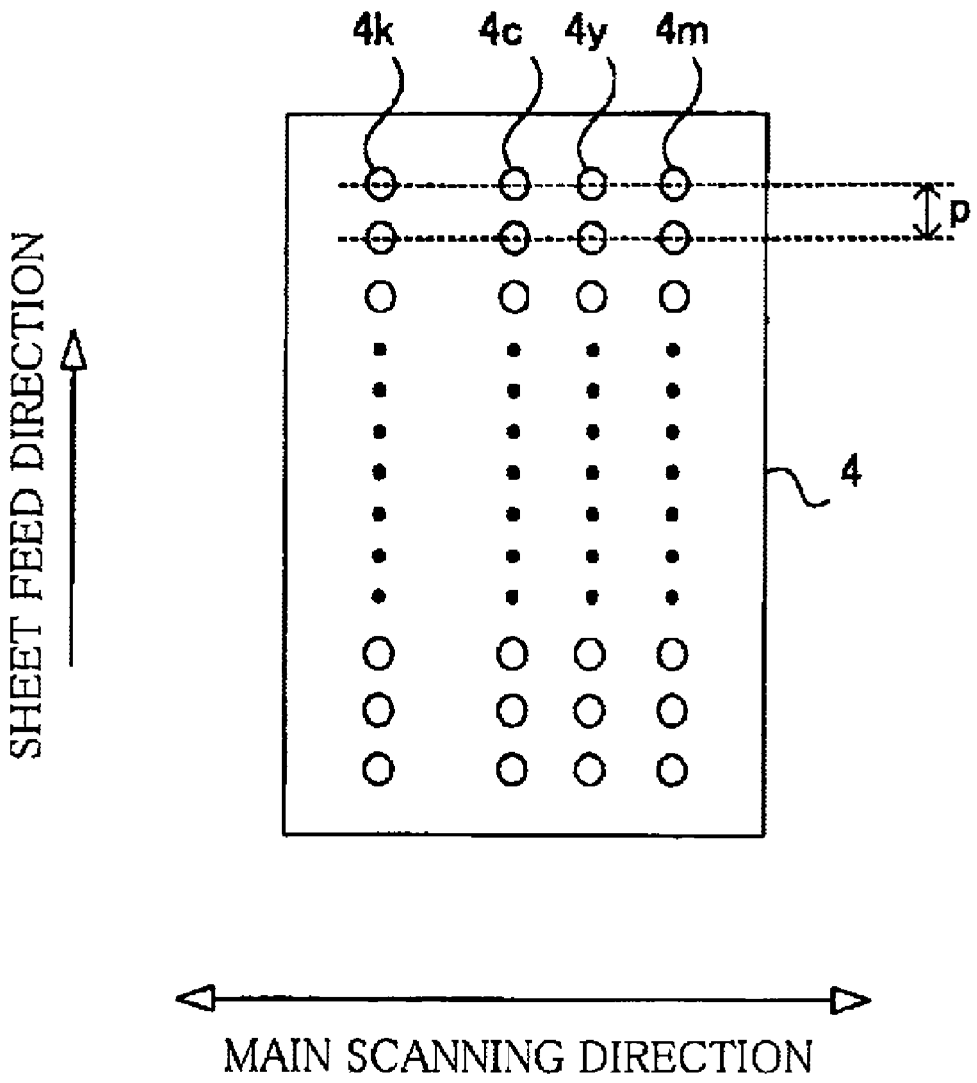
FIG. 4 is a lower plan view schematically showing a recoding head of the multi function device of FIG. 1.

FIG. 4 is a lower plan view of the recoding head 4 having a plurality of ink ejection nozzles which are arranged in a multiplicity of columns and four rows 4*k*, 4*c*, 4*y*, 4*m* each extending substantially in parallel with the feed direction of each recording sheet P (i.e., the sheet discharging direction corresponding to the sub-scanning direction) and which are spaced apart from each other by a spacing pitch p. The nozzles of the row 4*k*, the nozzles of the row 4*c*, the nozzles of the row 4*y* and the nozzles of the row 4*m* are arranged to eject therethrough the black (Bk), cyan (C), magenta (M), and yellow (Y) inks, respectively.

The MFD 1 is equipped with a control system including: a microcomputer which incorporates there CPU, ROM, RAM, etc. and which controls an entirety of the MFD 1; and ASCI (application specific integrated circuit) which is operable, in response to commands supplied from the microcomputer (hereinafter simply referred to as CPU 100), to control the components such as the LF motor 54, CR motor, recording head 4 and CIS 17.

To the ASIC, there is connected a panel interface, a parallel interface (or USB interface), and a network control unit (NCU). Through the panel interface, the ASIC receives information inputted by an operator through the operating keys 14*a* of the operation panel 14, supplies the received information to the CPU 100, and commands the LCD 14*b* of the operation panel 14 to display various messages, in response to display commands supplied from the CPU 100. Through the parallel interface (or USB interface), the ASIC communicates with an external device such as a personal computer. Through the NCU, the ASIC communicates via a public switched telephone network (PSTN). The NCU is connected to a modem serving to demodulate communication signals supplied to the NCU via the PSTN and to modulate data such as facsimile data that are to be transmitted out from the NCU, into communication signals.

Thus, in the present embodiment, the MFD 1 performs each of the printing, copying, scanning and facsimile functions, by operations of the CPU 100 and the ASIC connected to the same 100. In the present specification, these elements such the panel interface, parallel interface, UBS interface, NCU and modem are not described in detail and not shown in the accompanying drawings.

In the printing, copying or facsimile operation for forming an image on a recording sheet P, the CPU 100 first commands the ASIC to drive or rotate the LF motor 54 in a predetermined direction so as to rotate the sheet supply roller 6*b* in a sheet supplying direction, so that one recording sheet P is supplied from the sheet cassette 3 toward the sheet feed roller 50. Then, the LF motor 54 is intermittently rotated in an opposite direction (opposite to the above-described predetermined direction) by a predetermined amount per each of its successive rotations, so that each of the sheet feed roller 50 and sheet discharge roller 28 is intermittently rotated by a predetermined amount per each of its successive rotations, in a direction causing the recording sheet P to be fed in the feed direction, for stepwise moving the sheet P, namely, for positioning the sheet P in a desired recording position by each of successive motions of the sheet feed roller 50 and sheet discharge roller 28. The CPU 100 commands the ASIC to rotate the CR motor for moving the carriage 5 in the main scanning direction, and to cause the recording head 4 to eject the ink according to recording data, while the sheet P is temporarily stopped on the platen 26 after each of the successive feed motions of the sheet P.

As a result of the ink ejection made during each of the successive movements of the carriage 5 in the main scanning direction, a portion of the desired image is formed. The CPU 100 commands the ASIC to repeat the above-described intermittent rotation of the LF motor 54 (for feeding the recording sheet P), intermittent rotation of the CR motor (for moving the carriage 5) and intermittent ink ejection of the recording head 4, so as to complete the formation of the desired image on the recording sheet P.

As described above, while the recording sheet P is being fed from the sheet cassette 3 to the recording portion 7, the direction of rotation of the LF motor 54 is changed by the CPU 100, due to the arrangement in which the sheet supply roller 6*a*, feed roller 50 and discharge roller 28 are simultaneously rotated by a drive force transmitted from the LF motor 54 thereto. In the present embodiment, while the supply roller 6*a* is rotated in the direction causing the recording sheet P to be supplied from the sheet cassette 3, the feed roller 50 and discharge roller 28 is rotated in a direction opposite to the sheet feed direction causing the recording sheet P to be fed in the feed direction toward the sheet discharging portion 10, so that an inclination of the sheet P, if any, can be corrected owing to contact of its leading end with the feed roller 50 and the nip roller 51 that are rotated in the opposite direction inhibiting the sheet P from being further fed in the feed direction. Subsequently, the direction of rotation of the LF motor 54 is changed to the direction causing the recording sheet P to be fed in the feed direction, so that the sheet P is fed from the recording portion 7 toward the sheet discharge portion 10.

For feeding the recording sheet P in the above-described manner, the gear train 6*c* connecting the LF motor 54 and the sheet supply roller 6*b* is selectively placed in a transmission state in which the drive force is transmitted from the LF motor 54 to the sheet supply roller 6*b*, and in a non-transmission state in which the drive force is not transmitted. The gear train 6*c* is placed in the transmission state only in a stage of the supply of the sheet P from the sheet cassette 3. It is noted that, in the present embodiment, the feed roller 50, LF motor 54 and components (e.g., timing belt or gears) connecting the feed roller 50 and the LF motor 54 cooperate to constitute a feed mechanism.

Figure 5:
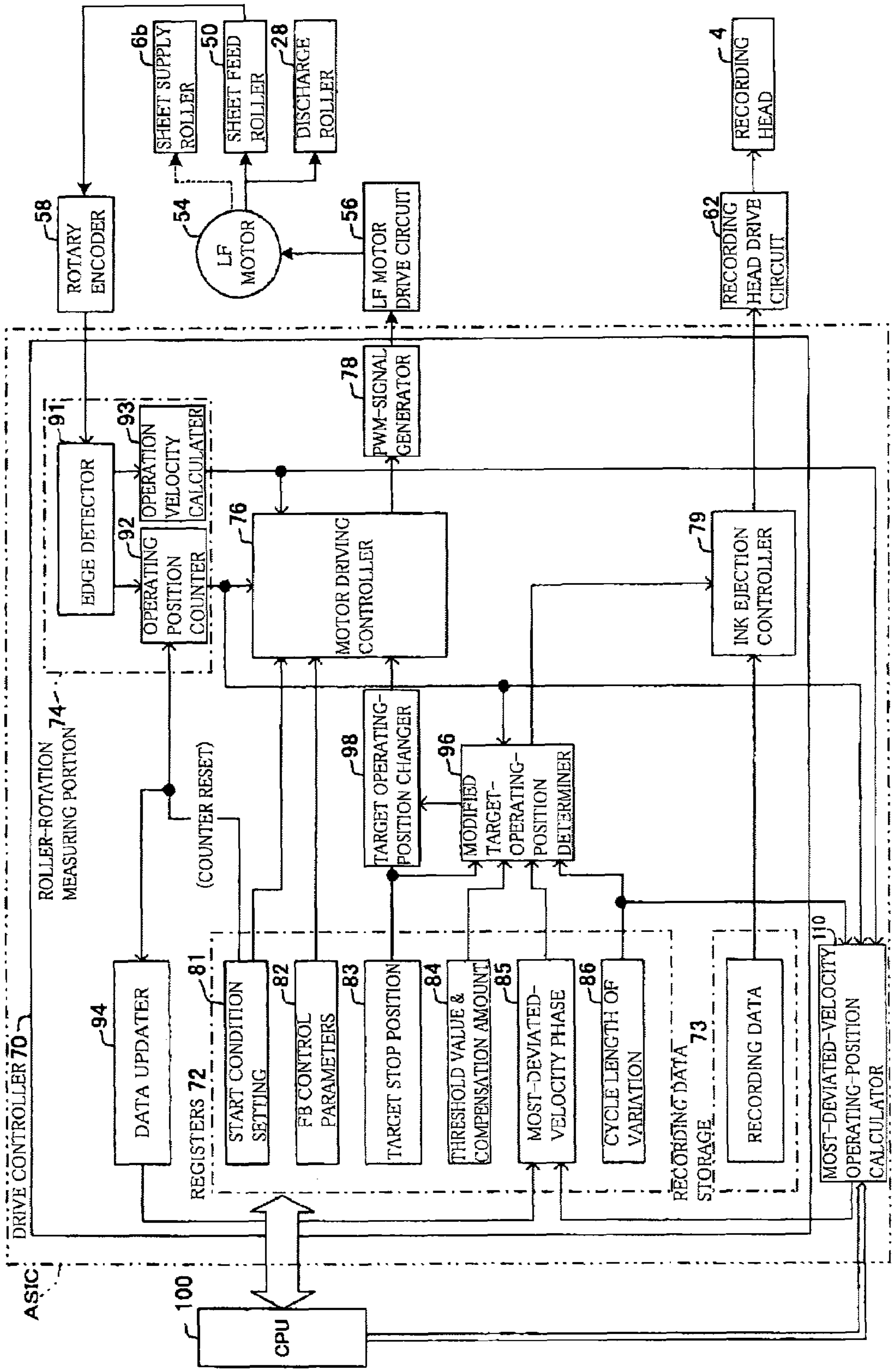
FIG. 5 is a block diagram showing a control system incorporated in the multi function device of FIG. 1 for controlling a feed motion of a recording medium.

FIG. 5 is a block diagram showing the control system including the CPU 100 and the ASCI, which is operable, according to commands supplied from the CPU 100, to control the LF motor 54 and the recording head 4, for feeding the recording sheet P and forming an image on the fed sheet P as described above.

In the present embodiment, the LF motor 54 is provided by a DC brush motor. To the sheet feed roller 50 that is rotated by the LF motor 54, there is connected a rotary encoder 58 for detecting an angular position (i.e., operating position or amount) of the feed roller 50, as shown in FIG. 5.

The rotary encoder 58 includes a rotary disk which is to be rotated together with the sheet feed roller 50 and which has a multiplicity of slits equi-angularly spaced from each other about its axis, and a detecting portion provided by a photointerrupter including a light emitter and a light receiver that are opposed to each other via the slits of the rotary disk. The detecting portion outputs two kinds of pulse trains, i.e., first and second encoder pulse trains ENC1, ENC2, that are offset from each other by a predetermined amount of phase (e.g., one-fourth of one period or cycle length of the pulse trains), so that the direction of the rotation of the feed roller 50 can be easily detected from the two kinds of pulse trains outputted by the detecting portion, That is, when the LF motor 54 rotates the feed roller 50 and the discharge roller 28 in the sheet feed direction, the first encoder pulse train ENC1 precedes the second encoder pulse trains ENC2 by the predetermined amount of phase. When the LF motor 54 rotates the feed roller 50 and the discharge roller 28 in the direction opposite to the sheet feed direction, the second encoder pulse train ENC2 precedes the first encoder pulse trains ENC1 by the predetermined amount of phase. It is noted that each of the pulse trains ENC1, ENC2 is constituted by successions of pulse signals, and the number of the pulse signals outputted by the detecting portion during each one rotation of the feed roller 50 corresponds to 360° divided by a minimum controllable operating angle $\theta_M$ of the feed roller 50. In other words, a resolution of the encoder corresponds to 360° divided by the minimum controllable operating angle $\theta_M$ of the feed roller 50.

The pulse signals of the pulse trains ENC1, ENC2 outputted by the rotary encoder 58 are inputted to a drive controller 70 that is a part of the ASIC. The drive controller 70 controls the LF motor 54 and the recording head 4 in response to commands supplied from the CPU 100. Specifically, the drive controller 70 generates a PWM (pulse width modulation) signal for controlling the velocity and direction of the rotation of the LF motor 54, and supplies the PWM signal to a LF motor drive circuit 56, so as to drive the LF motor 54. Further, the drive controller 70 generates an ejection nozzle assigning signal for assigning at least one of the nozzles of the recording head 4 through which the ink is to be ejected, and supplies the ejection nozzle assigning signal to a recording head drive circuit 62, so as to cause the assigned nozzle or nozzles to eject the ink therethrough.

The drive controller 70 includes: a group of registers 72 storing various parameters used to control the LF motor 54; a recording data storage 73 storing recording data used to control the recording head 4; a roller-rotation measuring portion 74 operable to measure or calculate the angular position (i.e., operating position or amount) and the rotational velocity of the feed roller 50, based on the pulse signals of the pulse trains ENC1, ENC2 supplied from the rotary encoder 58; a motor driving controller 76 operable to generate a command signal for driving the LF motor 54; a PWM-signal generator 78 operable, in response to the command signal supplied from the motor driving controller 76, to generate the PWM signal for driving the LF motor 54 with a variable duty ratio; and an ink ejection controller 79 operable to generate the ejection nozzle assigning signal based on the recording data stored in the recording data storage 73.

The roller-rotation measuring portion 74 includes an edge detector 91, an operating position counter 92, and an operation velocity calculator 93. The edge detector 91 detects, based on the pulse signals of the pulse trains ENC1, ENC2 supplied from the rotary encoder 58, a pulse edge indicative of start end of each pulse signal of the first pulse train ENC1 (e.g., a leading or trailing edge of each pulse signal of the first pulse train ENC1 while the second pulse train ENC2 is in a high level), and a rotation direction of the feed roller 50 (e.g., a forward rotation direction detected if the detected pulse edge is the trailing edge of each pulse signal of the pulse train ENC1, and a reverse rotation direction if the detected signal edge is the leading edge each pulse signal of the pulse train ENCd). The edge detector 91 generates an edge detection signal indicative of the detection of the pulse edge, and supplies the edge detection signal to the operating position counter 92 and the operation velocity calculator 93. Upon supply of the edge detection signal from the edge detector 91, the operating position counter 92 increases a total number of the edge detection signals, when the rotation direction of the feed roller 50 is the sheet feed direction causing the recording sheet P to be fed in the feed direction toward the sheet discharging portion 10. The operating position counter 92 reduces the total number of the edge detection signals, when the rotation direction of the feed roller 50 is the direction opposite to the sheet feed direction (namely, when the recording sheet P is supplied from the sheet cassette 3 by the supply roller 6*b*). Thus, the operating position counter 92 detects the angular position (i.e., operating position or amount) of the feed roller 50. The operation velocity calculator 93 measures a time interval between successive edge detection signals supplied from the edge detector 91, by comparing the time interval with a period of an internal clock CK having a constant pulse width. That is, the operation velocity calculator 93 counts the number of pulses of the internal clock CK within the time interval between the successive edge detection signals, and calculates the rotational velocity of the feed roller 50 based on the counted number of pulses and the period of the internal clock CK.

The registers 72 include: a register 81 for setting up a condition for starting operation of the drive controller 70; a register 82 for setting feedback (FB) control parameters including various control gains (such as proportional gain and integration gain) required to perform a feedback (FB) control with respect to the rotational velocity of the feed roller 50; a register 83 for setting a target operating position of the feed roller 50 in which the feed roller 50 is to be stopped (i.e., a target feed count value representative of a target operating amount of the feed roller 50 measured from start of the rotation of the feed roller 50); a register 84 for setting a threshold value E based on which it is anticipated whether the feed roller 50 (recording medium) fails to be accurately positioned in a next target operating position (next desired recording position) due to a cyclic variation of the rotational velocity of the roller feeder 50 caused by a torque fluctuation of the above-described feed mechanism (for example, originating from cogging of the LF motor 54), and a compensation amount F by which the next target operating position is changed when failure of accurate positioning of the feed roller 50 (recording medium) is anticipated; a register 85 for setting a most-deviated-velocity phase (most-deviated-velocity operating position) of the feed roller 50 in which the rotational velocity of the feed roller 50 is most deviated from its reference value within each one cycle of the cyclic variation; and a register 86 for setting a cycle length B of the cyclic variation.

Among the various parameters set by the registers 72, all the parameters (except the most-deviated-velocity phase that is to be set by the register 85) are supplied to the respective registers 81, 82, 83, 84 and 86 from the CPU 100. Meanwhile, the most-deviated-velocity phase is supplied to the register 85, upon power on of the MFD 1, from a most-deviated-velocity operating-position calculator 110 which is apart form the drive controller 70 and which is incorporated in the ASIC.

The most-deviated-velocity phase is represented in terms of an angular distance of the most-deviated-velocity phase from a reference angle (reference operating position) of the feed roller 50. A position count value indicated by the operating position counter 92 is set at its initial value (i.e., zero) in the reference operating position of the feed roller 50. Thus, the distance of the most-deviated-velocity phase from the reference operating position is represented by the position count value that is indicated by the operating position counter 92 when an actual operating position of the feed roller 50 coincides with the most-deviated-velocity phase. However, once the MFD 1 is powered off the reference operating position of the feed roller 50 is reset upon power on of the feed roller 50, namely, the position count value indicated by the operating position counter 92 is set at zero in an initial operating position upon power on of the feed roller 50. It is therefore necessary to update, upon resetting of the reference operating position, data representative of the most-deviated-velocity phase and stored in the register 85. To this end, the drive controller 70 includes a data updater 94 operable to update the data representative of the most-deviated-velocity phase, based on the position count value that had been indicated before resetting of the reference operating position.

In the present embodiment, the register 85 storing the above-described data representative of the most-deviated-velocity phase and the register 86 storing data representative of the cycle length B of the cyclic variation cooperate to correspond to a cyclic-variation-related data storage.

The drive controller 70 includes a modified target-operating-position determiner 96 operable, during intermittent movement of the feed roller 50 in formation of an image on the recording medium, to anticipate whether the recording medium fails to be accurately positioned in the desired recording position after each of successive motions of the medium, namely, whether the feed roller 50 fails to be accurately stopped in the target operating position (that is registered in the register 83) after each of successive motions of the roller 50, on the basis of the threshold value E registered in the register 84, the most-deviated-velocity phase of the feed roller 50 registered in the register 85 and the cycle length B of the cyclic variation registered in the register 86, and to determine a modified target operating position on the basis of the compensation amount registered in the register 84 when anticipating failure of accurate positioning of the recording medium or the feed roller 50. The drive controller 70 further includes a target-operating-position changer 98 operable to change the target operating position as an original target operating position (registered in the register 83) to the modified target operating position determined by the modified target-operating-position determiner 96, and to supply the motor driving controller 76 with data representative of the modified target operating position. In the present embodiment, the modified target-operating-position determiner 96 constitutes an accurate-positioning failure anticipator. The modified target-operating-position determiner 96 and the target operating-position changer 98 cooperate with each other to constitute a modified power-supply-stop operating-position determiner.

The motor driving controller 76 receives, from the target-operating-position changer 98, the data representative of the modified target operating position, as described above, whereby the LF motor 54 is controlled by the motor driving controller 76 based on the data representative of the modified target operating position in addition to the feedback (FB) control parameters that are supplied to the motor driving controller 76 from the register 82.

Figure 10A:
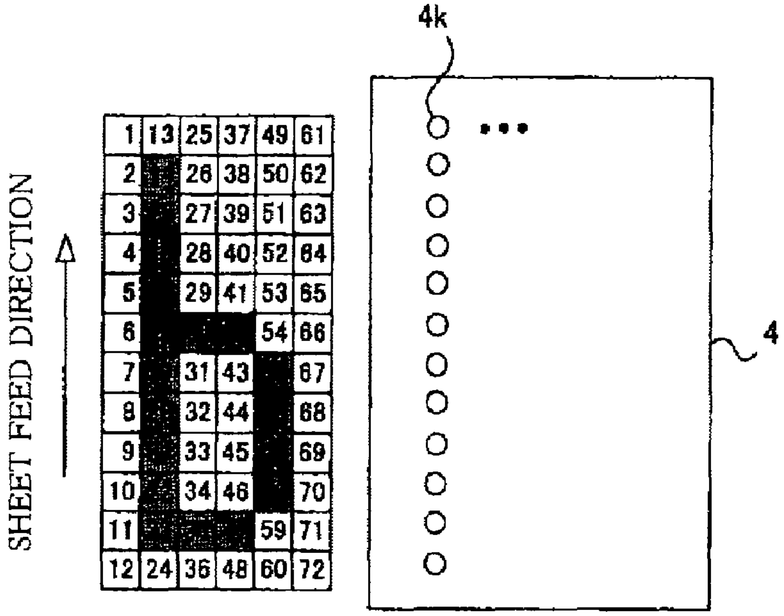
FIG. 10A is a view showing positions of assigned nozzles (the ink ejection portions) through which an ink is to be ejected during the formation of the image on the recording medium without the assigned nozzles being shifted.
Figure 10B:
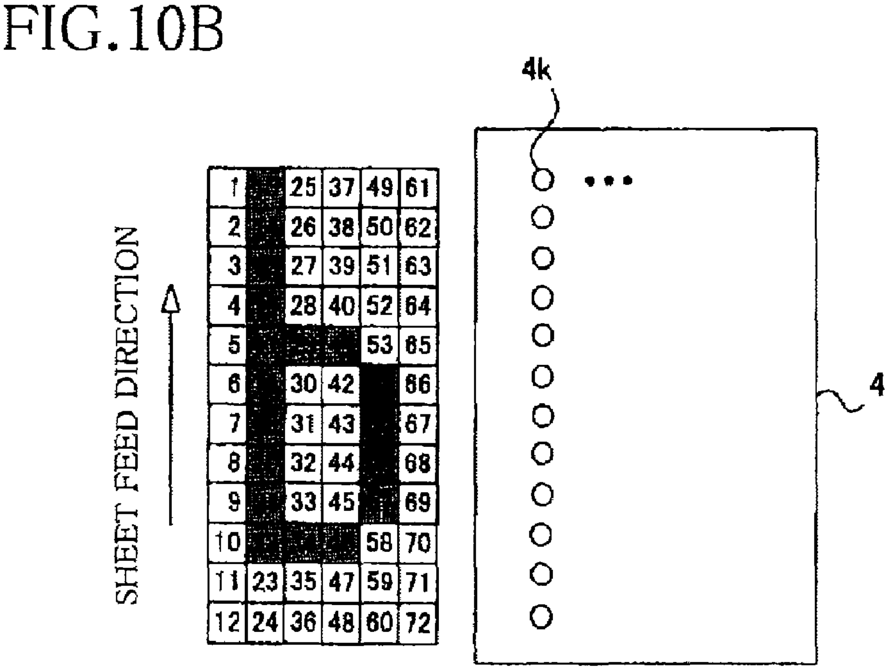
FIG. 10B is a view showing positions of the assigned nozzles during the formation of the image with the assigned nozzles being shifted.

Further, the target-operating-position determiner 96, when anticipating failure of accurate positioning of the recording medium or the feed roller 50, supplies the ink ejection controller 79 with a shift command requesting assigned ink ejection portions of the recording head 4 to be shifted in one of upstream and downstream directions in which the desired recording position is shifted as a result of the change of the target operating position, for avoiding a position of the assigned ink ejection portion or portions relative to the recording medium from being changed by the change of the target operating position. That is, the target-operating-position determiner 96 commands the ink ejection controller 79 to replace each of originally assigned ink ejection nozzles with another ink ejection nozzle that is distant from the originally assigned ink ejection nozzle by a shift distance of the desired recording position. In the present embodiment, each of the originally assigned ink ejection nozzles is replaced with an ink ejection nozzle which is adjacent to the originally assigned ink ejection nozzle and which is located on the downstream side of the originally assigned ink ejection nozzle (see FIGS. 10A and 10B).

For allowing the replacement of the assigned ink ejection nozzles, in the present embodiment, the ink ejection nozzles located in a downstream end one of the columns serves as reserved nozzles that are not assigned unless the target operating position is changed. However, in a modified arrangement in which each of the originally assigned ink ejection nozzles is replaced with an ink ejection nozzle which is located on the upstream side of the originally assigned ink ejection nozzle, the ink ejection nozzles located in an upstream end one of the columns are arranged to serve as reserved nozzles. In the present embodiment, the LF motor drive circuit 56, registers 72, motor driving controller 76, PWM-signal generator 78, modified, target-operating-position determiner 96 and target operating-position changer 98 cooperate to constitute a feed controller. The LF motor drive circuit 56, motor driving controller 76 and PWM-signal generator 78 cooperate to constitute a power supply controller.

Figure 8:
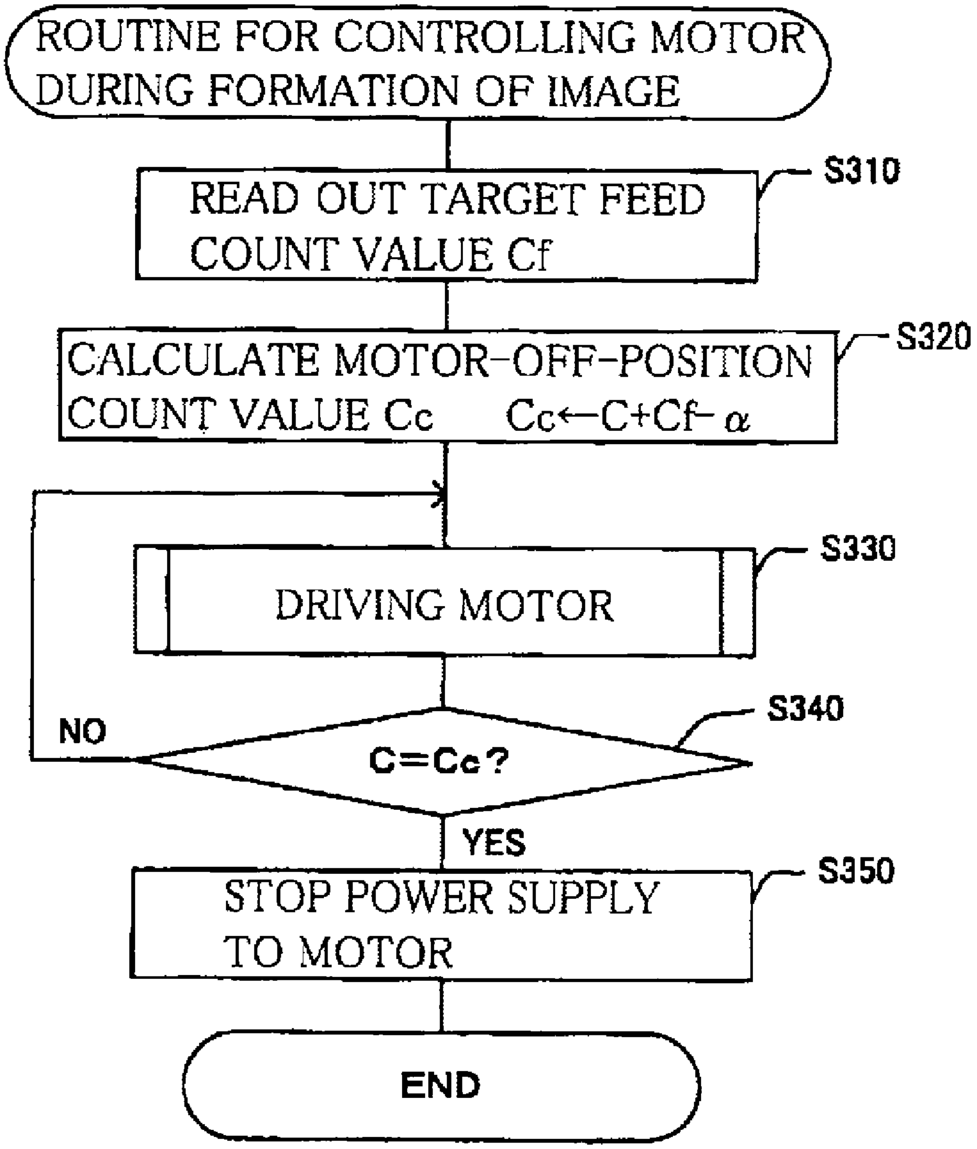
FIG. 8 is a flow chart showing a routine executed for controlling a motor during formation of an image on the recording medium.
Figure 9:
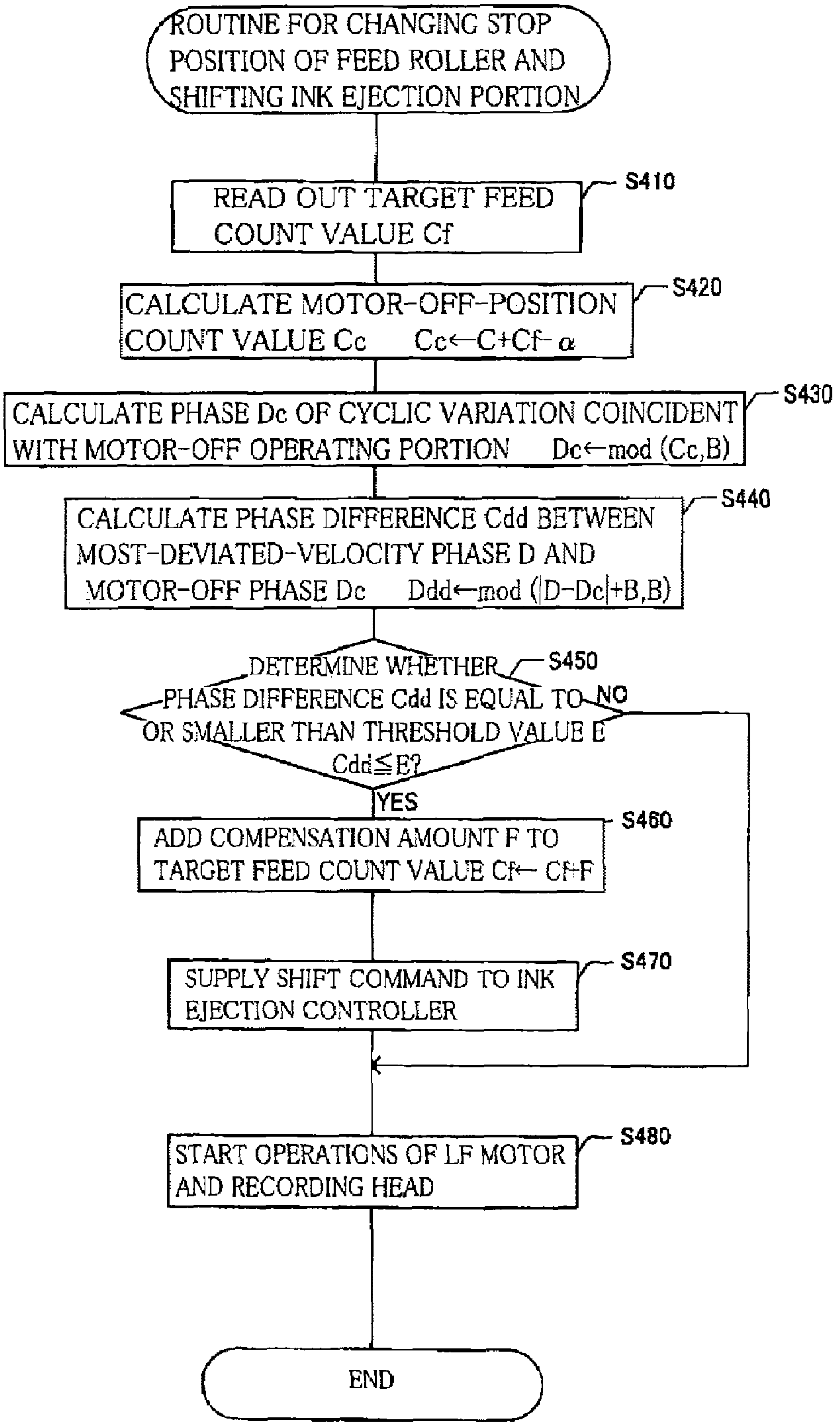
FIG. 9 is a flow chart showing a routine executed for changing a target operating position (stop position) of the feed roller, and shifting ink ejection portions of a recording head.

Next, there will be described operations of the most-deviated-velocity operating-position calculator 110, the motor driving controller 76, the modified target-operating-position determiner 96, the target operating-position changer 98 and the data updater 94. Although these elements 110, 76, 96, 98, 94 are provided in the ASIC, they may be provided by software control programs that are executed by a microcomputer. For facilitating understanding of the operation of each of the elements, the following description will be made with reference to flow charts that are shown in FIGS. 6, 8 and 9.

Figure 6:
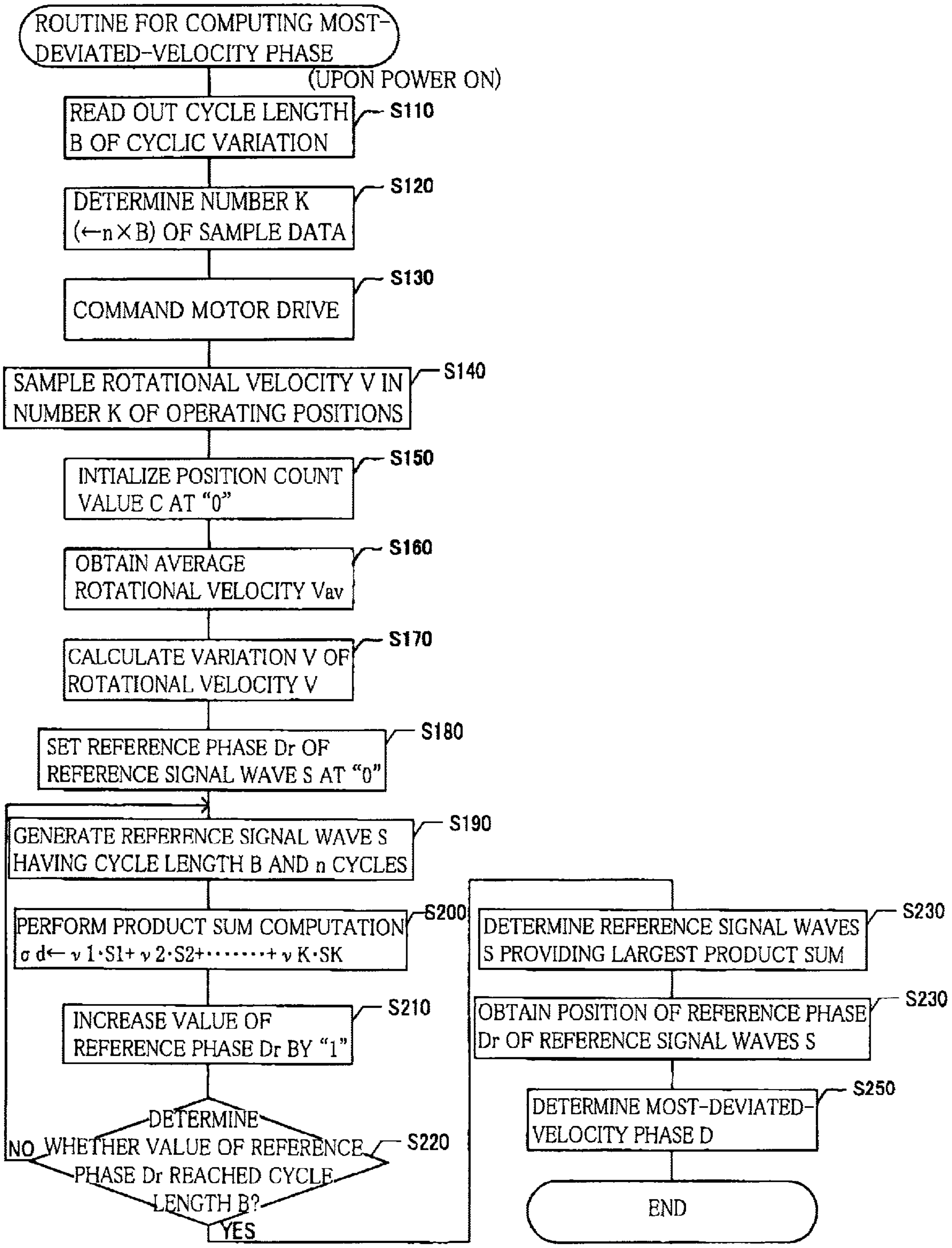
FIG. 6 is a flow chart showing a routine executed for computing a most-deviated-velocity operating position.

FIG. 6 is a flow chart showing a routine executed by the most-deviated-velocity operating-position calculator 110, for computing the most-deviated-velocity phase. This routine, which is executed only once upon power on of the MFD 1, is initiated with step S110 to read out the cycle length B of the cyclic variation registered in the register 86. The cycle length B is expressed in terms of the number of the edge detection signals outputted from the edge detector 91.

Subsequently, step S120 is implemented to obtain a number K of sets of sample data for sampling the rotational velocity V in the number K of the operating positions of the feed roller 50, by multiplying the cycle length B with a predetermined coefficient n. Then, step S130 is implemented to supply the CPU 100 with a command requesting the LF motor 54 to be driven, such that the feed roller 50 is intended to be rotated by the LF motor 54 in the above-described sheet feed direction at a constant velocity. Then, step S140 is implemented to sample the rotational velocity V in each of the number K of the operating positions of the feed roller 50, which is outputted from the operation velocity calculator 93, while the feed roller 50 is being rotated.

Figure 7:
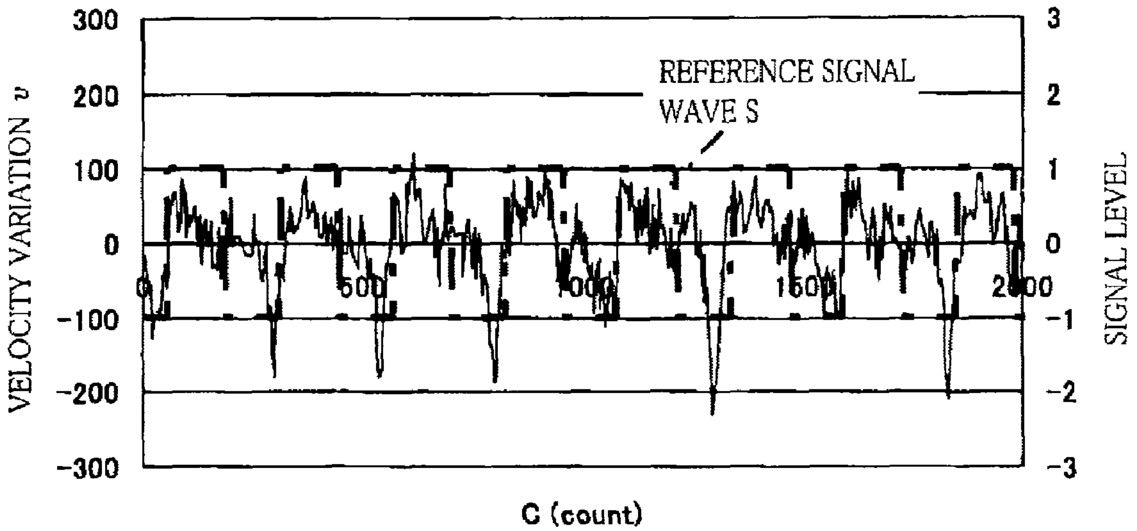
FIG. 7 is a view showing a cyclic variation of an operating velocity of a feed roller and a reference signal wave that is used for computing the most-deviated-velocity operating position.

Subsequently, step S150 is implemented to command a resetter of the CPU 100 to reset the position count value C indicated by the operating position counter 92, so as to initialize the position count value C at zero. Then, step S160 is implemented to obtain an average value Vav (as the reference value) from the sampled rotational velocity V in each of the number K of the operating positions of the feed roller 50. Then, step S170 is implemented to calculate an amount of deviation of the sampled rotational velocity V from the average value Vav (see FIG. 7).

Subsequently, step S180 is implemented to set a reference phase Dr of a reference signal wave S at its initial value (i.e., zero) (Dr←0). The reference phase Dr of the reference signal wave S may be, for example, a phase of a first leading edge of the reference signal wave S. Then, step S190 is implemented to generate the reference signal wave S which has a cycle length equal to the cycle length B of the cyclic variation v and which has at least one cycle (n cycle or cycles), such that the reference phase Dr (e.g., the first leading edge) of the generated reference signal wave S coincides with an actual operating position of the feed roller 50 (i.e., a position in which the feed roller 50 is currently stopped). The reference signal wave S is a data train represented by a rectangular waveform, and each cycle of the reference signal wave S is constituted by one positive region (e.g., high level region with a value of +1) and one negative region (e.g., low level region with a value of −1). Then, step S200 is implemented to perform a product sum computation between the reference signal wave S and the amounts of the deviations of the rotational velocities V in the respective operating positions that overlap with the reference signal wave S, as follows:

$$\sigma d \leftarrow v1 \cdot S1 + v2 \cdot S2 + \ldots + vK \cdot SK$$

Subsequently, step S210 is implemented to shift the position of the reference phase Dr by one, namely, to increase the value of the reference phase Dr by one (Dr←Dr+1). Then, step S220 is implemented to determine whether the value of the reference phase Dr has reached to a value corresponding to the cycle length B of the cyclic variation (Dr≧B), so as to see if step S190 (for generating the reference signal wave S) and step S200 (performing the product sum computation) have been implemented number of times corresponding to one cycle of the cyclic variation v.

If a negative decision (NO) is obtained in step S220, the control flow goes back to step S190 so that another reference signal wave S is generated with the position of its reference phase Dr is shifted by one, from a position of the reference phase Dr of a reference signal wave S that was generated in the last implementation of step S190. Step S190 is followed by step S200 to perform the product sum computation between the another reference signal wave S and the amounts of the deviations of the rotational velocities V in the respective operating positions that overlap with the another reference signal wave S.

If a affirmative decision (YES) is obtained in step S220, the control flow goes to step S230 that is implemented to determine one of the reference signal waves S that provides a product sum largest among those provided by the reference signal waves S. Then, step S240 is implemented to obtain the position of the reference phase Dr of the above-described one of the reference signal waves S that provides the largest product sum. Then, step S250 is implemented to determine the most-deviated-velocity phase D of the feed roller 50, based on the obtained position of the reference phase Dr of the above-described one of the reference signal waves S. It is notated that a distance between the reference phase Dr (e.g., first leading edge) of the above-described one of the reference signal waves S and the most-deviated-velocity phase D is a known value.

As described above, the most-deviated-velocity operating-position calculator 110 detects the cyclic variation v of the rotational velocity V of the feed roller 50 rotated by the LF motor 54, namely, the change of the rotational velocity V with respect to the operating angular position of the feed roller 50, and then calculates the sum of the products of the cyclic variation v and each of the plurality of reference signal waves S which are represented by identical waveforms and which are sequentially generated such that each of the reference signal waves S is positioned in a position shifted by a distance corresponding to the resolution of the edge detector 91, from a position of one of the reference signal waves S preceding the each reference signal wave S. Thus, the most-deviated-velocity operating-position calculator 110 performs the product sum computation the number of times corresponding to one cycle of the cyclic variation v, and determines one of the reference signal waves S that provides the largest product sum, so that the calculator 110 obtains a distance of the most-deviated-velocity phase D from the reference operating position, which distance is represented by the position count value C indicated by the operating position counter 92. The calculator 110 includes a data provider for providing the register 85 with data representative of the distance of the most-deviated-velocity phase D from the reference operating position. It is noted that the detection of the cyclic variation v of the rotational velocity V is made preferably over an operating angular range corresponding to at least twice the cycle length B of the cyclic variation.

In the present embodiment, the most-deviated-velocity operating-position calculator 110 serving as a most-deviated-velocity operating-position obtainer is principally constituted by an operating-velocity-deviation-related data storage, a reference signal wave generator and a product-sum-computation-based obtainer. In the most-deviated-velocity operating-position calculator 110, as described above, the most-deviated-velocity phase D can be obtained by the product sum computation, in association with the position count value C indicated by the operating position counter 92, without having to perform a complicated computation such as FFT (fast Fourier transform).

FIG. 8 is a flow chart showing a routine executed by the motor driving controller 76, for controlling the LF motor 54 during formation of an image on the recording sheet P. This routine is initiated with step S310 to read out, from the register 83, a target operating angular position (stop angular position) in which the feed roller 50 is to be positioned by its rotation in the sheet feed direction. Described specifically, in this step S310, the motor drive controller 76 reads out a target feed count value Cf representing, in terms of the position count value C indicated by the operating position counter 92, an amount of rotation by which the feed roller 50 is to be rotated from an actual stop position. Then, step S320 is implemented to calculate a motor-OFF-position count value Cc representative of a motor-OFF operating position (power-supply-stop operating position), based on an actual-position count value C, the target feed count value Cf and an inertial operating amount a by which the feed roller 50 is to be rotated by inertia after supply of the power to the LF motor 54 is stopped, according to an expression (1) as given below. The motor-OFF operating position is an operating angular position of the feed roller 50 in which the supply of the power to the LF motor 54 is to be stopped, for allowing the feed roller 50 to be stopped in the target operating position.

$$Cc=C+Cf-\alpha \quad (1)$$

Figure 12A:
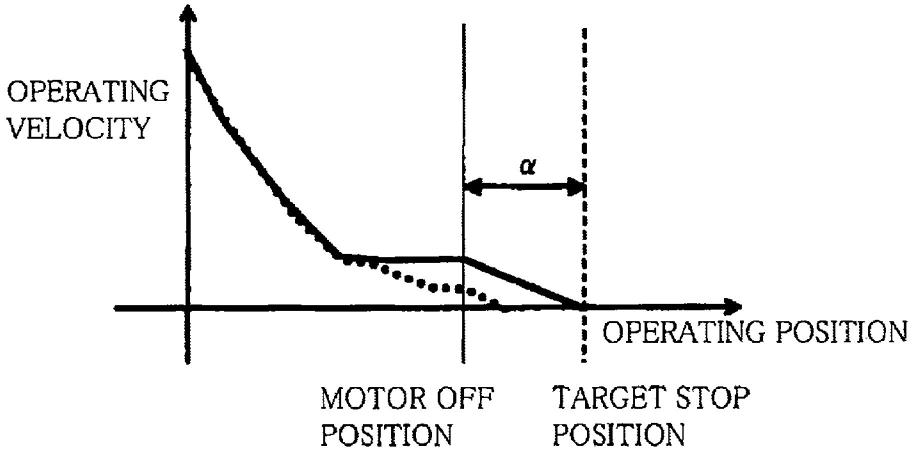
FIG. 12A is a view showing a manner for stopping the feed roller in the target operating position.
Figure 12B:
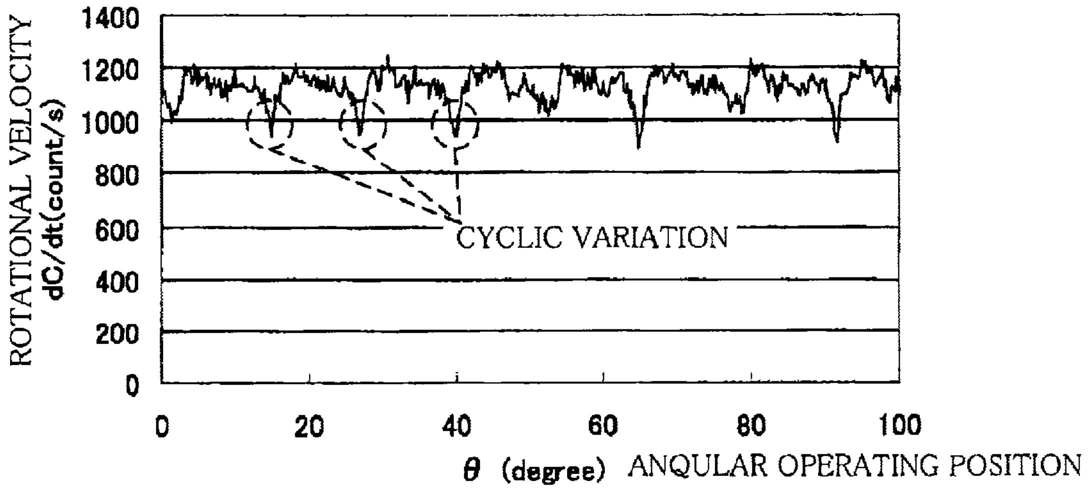
FIG. 12B is a view showing the cyclic variation of the operating velocity of the feed roller, which is caused by a torque fluctuation of a feed mechanism.

Subsequently, in step S330, the LF motor 54 is driven to rotate the feed roller 50 in the sheet feed direction, and is controlled, as shown in FIG. 12A, such that the rotational velocity V of the feed roller 50 is reduced to be an extremely low value before the actual position count value C indicated by the operating position counter 92 coincides with the motor-OFF-position count value Cc that has been calculated in step S320 (namely, before the feed roller 50 reaches the motor OFF position).

While the LF motor 54 is being driven, step S340 is implemented to determine whether the actual position count value C indicated by the operating position counter 92 has coincided with the motor-OFF-position count value Cc. Until an affirmative decision is obtained in step S340, the implementation of step S330 for driving the LF motor 54 is continued. When the affirmative decision is obtained in step S340, the control flow goes to step S350 that is implemented to stop the supply of the power to the LF motor 54, so as to complete one of successive feed motions of the recording sheet P.

FIG. 9 is a flow chart showing a routine executed by the modified target-operating-position determiner 96 and the target operating-position changer 98, for changing the target operating position (stop position) of the feed roller 50, and shifting the ink ejection portions of the recording head 4. This routine is initiated with step S410 to read out, from the register 83, the target feed count value Cf representative of the target operating angular position of the feed roller 50, as in step S310 of the above-described routine of FIG. 8. Then, step S420 is implemented to calculate the motor-OFF-position count value Cc(=C+Cf−α), based on the actual-position count value C, the target feed count value Cf and the inertial operating amount α, according to the above-described expression (1), as in step S320 of the routine of FIG. 8.

Subsequently, step S430 is implemented to calculate a phase Dc of the cyclic variation of the rotational velocity V of the feed roller 50, which coincides with the motor-OFF operating position, according to the following expression (2) with parameters in the form of the motor-OFF-position count value Cc and the cycle length B of the cyclic variation. It is noted that, in the expression (2), "mod" represents a remainder obtained by dividing a former value (i.e., Cc) in parentheses by the latter value (i.e., B).

$$Dc=\mathrm{mod}(Cc, B) \quad (2)$$

Subsequently, step S440 is implemented to calculate a phase difference Cdd between the most-deviated-velocity phase D and the motor OFF phase Dc (that coincides with the motor-OFF operating position), according to the following expression (3) with parameters in the form of the motor OFF phase Dc ancd the cycle length B of the cyclic variation.

$$Cdd=\mathrm{mod}(|D-Dc|+B, B) \quad (3)$$

Subsequently, step S450 is implemented to read out the threshold value E from the register 84, and to determine whether the phase difference Cdd is equal to or smaller than the threshold value E. If it is determined in step S450 that the phase difference Cdd is large than the threshold value E (Cdd>E), the control flows goes to step S480 since it is anticipated or considered, in this case, that the positioning of the feed roller 50 in the next target operating position is not influenced by the cyclic variation of the rotational velocity V. If it is determined in step S450 that the phase difference Cdd is equal to or smaller than the threshold value E (Cdd≦E), on the other hand, the control flow goes to step S460 since it is anticipated or considered that the positioning of the feed roller 50 is influenced by the cyclic variation and that the feed roller 50 fails to be accurately positioned in the next target operating position.

In step S460, the compensation amount F is read out from the register 84, and the compensation amount F is then added to the target feed count value Cf representing the target operating angular position (C+Cf) that is determined by the CPU 100. Then, step S470 is implemented to supply the above-described shift command to the ink ejection controller 79.

The compensation amount F is set to a value that causes the phase difference Cdd to be made larger than twice the threshold value E (Cdd>2E). Namely, a substitution of the target feed count value Cf with a modified target feed count value (Cf+F) in the expression (1) causes the phase difference Cdd to be made larger than twice the threshold value E. Further, the value of the compensation amount F is equal to a value obtained by dividing a product of a count number A per one rotation of the rotary encoder 58 (i.e., one rotation of the feed roller 50), the spacing pitch p of the ink ejection nozzles and an integral number k, by a circumferential length L of the feed roller 50 (F=(A×p×k)/L). The count number A corresponds to the number of the pulse signals outputted by the rotary encoder 58 during each one rotation of the feed roller 50. In the present embodiment, the circumferential length L and the spacing pitch p are designed such that the value of the compensation F is an integral number. In other words, the spacing pitch p and the circumferential length L cooperate to satisfy the following two expressions:

$$\theta_F = k_1 p/L \times 360°$$

$$\theta_F = k_2 \theta_M$$

where "$\theta_F$" represents an operating angle of the feed roller 50 corresponds to the compensation amount F by which the modified target operating angular position (C+Cf+F) is distant from the original target operating angular position (C+Cf); "$k_1$" represents an integer number; "$k_2$" represents an integer number; and "$\theta_M$" represents a minimum controllable operating angle of the feed roller 50 corresponding to 360° divided by the count number A per one rotation of the feed roller 50.

Subsequently, step S480 is implemented to command the motor driving controller 76 and the ink ejection controller 79 to operate the LF motor 54 and the recording head 4. In a case of FIG. 10B where the image is formed on the recording sheet P with the motor-OFF operating position being modified (i.e., with the target operating angular position being modified) as a result of the affirmative decision (Cdd≦E) in step S450, the feed amount of the recording sheet P is made larger than in a case of FIG. 10A where the image is formed without the motor-OFF operating position being modified, by an amount corresponding to the spacing pitch p of the ink ejection nozzles of the recording head 4. Further, in the case of FIG. 10B, each of originally assigned ink ejection nozzles is replaced with another ink ejection nozzle which is adjacent to the originally assigned ink ejection nozzle and which is located on the downstream side of the originally assigned ink ejection nozzle.

Therefore, in the MFD 1 constructed according to the invention, even in presence of a cyclic torque fluctuation of the feed mechanism, for example, due to cogging of the LF motor 54, the formation of a clear image can be made owing to an accurate positioning of the recording sheet P relative to the assigned ink ejection nozzles, without suffering from an influence of the cyclic torque fluctuation.

In the routine of FIG. 9, steps S410-S450 are implemented by the accurate-positioning failure anticipator and the modified power-supply-stop operating-position determiner, step S460 is implemented by the target operating-position changer, and step S470 is implemented by an ink-ejection portion shifter.

Figure 11:
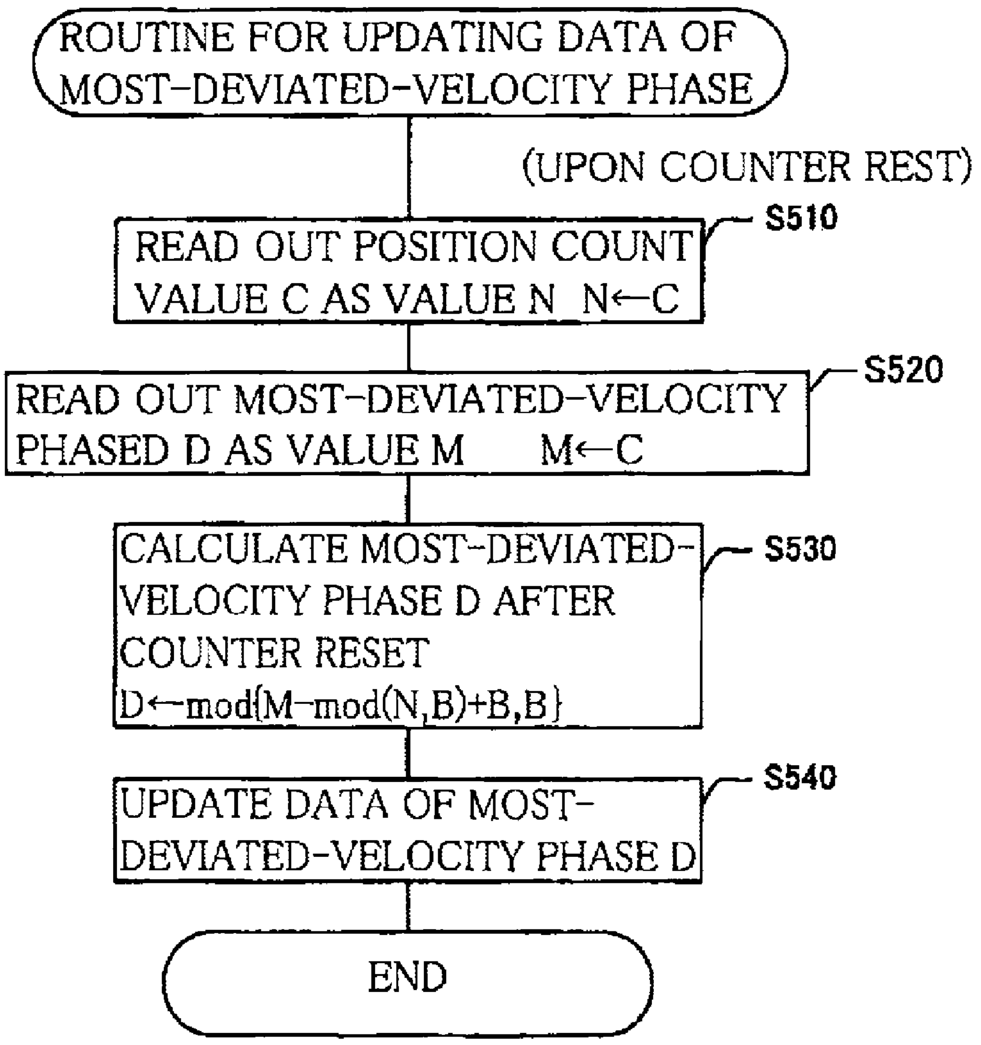
FIG. 11 is a flow chart showing a routine executed for updating data representative of the most-deviated-velocity operating position.

FIG. 11 is a flow chart showing a routine executed by the data updater 94, for updating data representative of the most-deviated-velocity operating position or phase. This routine is initiated, upon resetting of the position count value indicated by the operating position counter 92 in response to a reset command supplied from the CPU 100, with step S510 that is implemented to read out an actual position count value C (i.e., a count value before resetting of the position count value) indicated by the counter 92, and then set the actual position count value C as a value N.

Subsequently, step S520 is implemented to read out the most-deviated-velocity phase d from the register 85, and then set the most-deviated-velocity phase D as a value M. Then, step S530 is implemented to calculate the most-deviated-velocity phase d after resetting of the position count value, according to the following expression (4) with parameters in the form of the values N, M and the cycle length B of the cyclic variation.

$$D = \mathrm{mod}\{M - \mathrm{mod}(N, B) + B, B\} \quad (4)$$

Subsequently, step S540 is implemented to register the calculated most-deviated-velocity phase D into the register 85 so as to update the data representative of the most-deviated-velocity operating phase D. Owing to the execution of this routine of FIG. 11, even after the position count value indicated by the operating position counter 92 is reset to its initial value "zero", the most-deviated-velocity operating phase D is always represented by the data registered in the register 85, in terms of the position count value C indicated by the operating position counter 92, thereby making it possible to constantly monitor a current state of the cyclic variation.

As is clear from the foregoing description, in the MFD 1 constructed according to the above-described embodiment of the invention, the operating angular position of the feed roller 50 in which its rotational velocity is most deviated from the reference value within each one cycle of the cyclic variation v, is stored as the most-deviated-velocity phase D represented in terms of the position count value indicated by the operating position counter 92, and the phase difference Cdd between the most-deviated-velocity phase D and the motor OFF phase Dc (in which the supply of the power to the LF motor 54 is stopped) is calculated upon the feed motion of the recording sheet P that is made before or after each one scanning of the recording head 4 for forming the image on the recording sheet P. Where the phase difference Cdd is equal to or smaller than the threshold value E, the motor-OFF operating position as the original motor-OFF operating position is changed to the modified motor-OFF operating position, and the assigned ink ejection portions of the recording head 4 is shifted in the feed direction of the recording sheet P by a distance corresponding to a distance between the original and modified motor-OFF operating positions.

It is therefore possible to accurately position the recording sheet P in a desired recording position relative to the assigned ink ejection portions of the recording head 4 after each of successive feed motions of the recording sheet P, without suffering from the influence of the cyclic variation v of the rotational velocity V of the feed roller 50 caused by the torque fluctuation of the feed mechanism, whereby the formed image can be made clear. Further, since it is not necessary to fix dimensions of components constituting the feed mechanism for feeding the recording sheet P, unlike in the conventional arrangement, the feed mechanism can be constructed at a low cost.

Further, in the above-described embodiment, each time the MED 1 is powered on to get the control system ready, the most-deviated-velocity operating-position calculator 110 executes the routine of FIG. 6 so as to obtain the most-deviated-velocity phase D, by actually driving the LF motor 54 to rotate the feed roller 50. In addition, during the operations of the MFD 1, the data updater 94 is commanded to update the data representative of the most-deviated-velocity phase D each time the position count value of the operating position counter 92 is reset, so that the phase of the cyclic variation can be always monitored in view of the position count value C indicated by the operating position counter 92, thereby making it possible to improve the control accuracy.

Further, in the above-described embodiment, where the motor-OFF operating position is modified in the execution of the routine of FIG. 9, the feed amount of the recording sheet P is increased by the amount corresponding to the spacing pitch p of the ink ejection nozzles of the recording head 4, and each of originally assigned ink ejection nozzles (assigned to eject the ink therethrough onto the recording sheet P) is replaced with another ink ejection nozzle which is distant from the originally assigned ink ejection nozzle by the spacing pitch p and which is located on the downstream side of the originally assigned ink ejection nozzle. This arrangement reliably prevents mispositioning of each portion of the image that is formed after each one of the successive motions of the recording sheets P in the feed direction.

While the presently preferred embodiment of the present invention has been described above in detail, it is to be understood that the invention is not limited to the details of the illustrated embodiment, but may be otherwise embodied without departing from the spirit of the invention.

For example, while the rotary encoder 58 is connected to the sheet feed roller 50 in the above-described embodiment, the rotary encoder 58 may be connected to the LF motor 54 such that the rotary disk of the encoder 50 is rotatable together with an output shaft of the LM motor 54.

In the above-described embodiment, in the case of modification of the motor-OFF operating position in the execution of the routine of FIG. 9, the feed amount of the recording sheet P is increased by the spacing pitch p of the ink ejection nozzles of the recording head 4, and each of originally assigned ink ejection nozzles is replaced with another ink ejection nozzle which is distant from the originally assigned ink ejection nozzle by the spacing pitch p and which is located on the downstream side of the originally assigned ink ejection nozzle. However, the feed amount of the recording sheet P may be either increased or decreased by an amount corresponding to any integer number (n) of times as large as the spacing pitch p of the ink ejection nozzles. Further, the above-described another ink ejection nozzle for replacing each originally assigned ink ejection nozzle may be provided by an ink ejection nozzle which is distant from the originally assigned ink ejection nozzle by any integer number (n) of times as large as the spacing pitch p and which is located on either the downstream or upstream side of the originally assigned ink ejection nozzle.

What is claimed is:

1. An image forming apparatus comprising:

a feed mechanism including a motor that is to be driven with supply of a power thereto, and a feeder that is to be moved by said motor for feeding a medium in a feed direction;

a recording head operable to eject an ink toward the medium so as to form an image on the medium;

a feed controller operable, upon reception of a command requesting the medium to be fed to a desired recording position, to control said motor so as to move said feeder to a target operating position that causes the medium to be positioned in said desired recording position; and an ink ejection controller operable, upon positioning of the medium in said desired recording position, to cause at least one ink ejection portion of said recording head to eject the ink therethrough toward the medium, wherein said feed controller includes:

a target-operating-position changer operable, upon reception of said command, to change said target operating position as an original target operating position to a modified target operating position in which influence of a cyclic variation of an operation velocity of said feeder upon the positioning of the medium is smaller than in said original target operating position, said cyclic variation being caused by a torque fluctuation of said feed mechanism, and wherein said ink ejection controller includes:

an ink-ejection portion shifter operable, when said target operating position is changed, to shift said at least one ink ejection portion in one of upstream and downstream directions in which said desired recording position is shifted as a result of change of said target operating position, for avoiding a position of said at least one ink ejection portion relative to the medium from being changed by the change of said target operating position.

2. The image forming apparatus according to claim 1, wherein said feed controller further includes an accurate-positioning failure anticipator operable, upon reception of said command, to anticipate whether the medium fails to be accurately positioned in said desired recording position, based on said original target operating position of said feeder and said cyclic variation of said operating velocity of said feeder, and wherein said target-operating-position changer is operated, when failure of accurate positioning of the medium is anticipated by said accurate-positioning failure anticipator, to change said original target operating position to said modified target operating position.

3. The image forming apparatus according to claim 2, wherein said feed controller includes a cyclic-variation-related data storage storing data representative of a most-deviated-velocity operating position of said feeder in which said operating velocity of said feeder is most deviated from a reference value thereof within each one cycle of said cyclic variation, and wherein said accurate-positioning failure anticipator anticipates whether the medium fails to be accurately positioned in said desired recording position, based on a positional difference between said original target operating position and said most-deviated-velocity operating position of said feeder that is indicated by said data stored in said cyclic-variation-related data storage.

4. The image forming apparatus according to claim 3, wherein said data stored in said cyclic-variation-related data storage indicates a distance of said most-deviated-velocity operating position from a reference operating position of said feeder;

said image forming apparatus further comprising:

a resetter operable to reset said reference operating position of said feeder; and a data updater operable, upon resetting of said reference operating position, to update said data stored in said cyclic-variation-related data storage, such that said data indicates a distance of said most-deviated-velocity operating position from said reference operating position of said feeder that has been reset by said resetter.

5. The image forming apparatus according to claim 3, wherein said most-deviated-velocity operating position of said feeder is a lowest-velocity operating position of said feeder that causes said operating velocity of said feeder to be lowest within each one cycle of said cyclic variation.

6. The image forming apparatus according to claim 2, wherein said feed controller includes a power supply controller operable, upon reception of said command, to supply the power to said motor until an actual operating position of said feeder coincides with a power-supply-stop operating position located before said target operating position, and to stop the supply of the power to said motor when said actual operating position coincides with said power-supply-stop operating position, for causing said actual operating position to eventually coincide with said target operating position owing to an inertia of said feed mechanism, wherein said accurate-positioning failure anticipator anticipates whether the medium fails to be accurately positioned in said desired recording position, based on a positional difference between said power-supply-stop operating position and a most-deviated-velocity operating position of said feeder in which said operating velocity of said feeder is most deviated from a reference value thereof within each one cycle of said cyclic variation, said accurate-positioning failure anticipator anticipating that the medium fails to be accurately positioned in said desired recording position, where said positional difference is not larger than a threshold value, wherein said target-operating-position changer is operated, when the failure of accurate positioning of the medium is anticipated, to change said power-supply-stop operating position as an original power-supply-stop operating position to a modified power-supply-stop operating position, and wherein said target-operating-position changer includes a modified power-supply-stop operating-position determiner operable to determine said modified power-supply-stop operating position, such that a positional difference between said modified power-supply-stop operating position and said most-deviated-velocity operating position is larger than said positional difference between said original power-supply-stop operating position and said most-deviated-velocity operating position.

7. The image forming apparatus according to claim 6, wherein said modified power-supply-stop operating-position determiner determines said modified power-supply-stop operating position, such that said positional difference between said modified power-supply-stop operating position and said most-deviated-velocity operating position is at least twice as large as said threshold value.

8. The image forming apparatus according to claim 1, wherein said target-operating-position changer is operated to change said target operating position as said original target operating position to said modified target operating position that is located after said original target operating position, and wherein said ink-ejection portion shifter is operated, when said target operating position is changed, to shift said at least one ink ejection portion in the downstream direction.

9. The image forming apparatus according to claim 1, wherein said recording head has a plurality of ink ejection nozzles which are arranged in at least one row each extending substantially in parallel with said feed direction and which are spaced apart from each other by a spacing pitch in a direction of said at least one row, wherein said ink ejection controller is operated to assign at least one of said ink ejection nozzles as said at least one ink ejection portion to eject the ink therethrough toward the medium, wherein said target-operating-position changer is operated to change said target operating position as said original target operating position to said modified target operating position that is distant by an amount corresponding to a shift distance that is integer number of times as large as said spacing pitch, for shifting said desired recording position in said one of said upstream and downstream directions by said shift distance, and wherein said ink-ejection portion shifter is operated, when said target operating position is changed, to shift said at least one ink ejection portion in said one of said upstream and downstream directions, by replacing each of said at least one of said ink ejection nozzles with another of said ink ejection nozzles that is distant from said each of said at least one of said ink ejection nozzles by said shift distance.

10. The image forming apparatus according to claim 9, wherein said feeder is a cylindrical roller which has a circular cross section and which is to be rotated by said motor for feeding the medium that is brought into frictional contact with said cylindrical roller, and wherein said spacing pitch of said ink ejection nozzles and a circumferential length of said cylindrical roller cooperate to satisfy the following two equations:

$$\theta_F = k_1 p / L \times 360°$$

$$\theta_F = k_2 \theta_M$$

where "$\theta_F$" represents an operating angle of said cylindrical roller corresponds to said amount by which said modified target operating position is distant from said original target operating position; "$k_1$" represents an integer number; "p" represents said spacing pitch; "L" represents said circumferential length of said cylindrical roller; "$k_2$" represents an integer number; and "$\theta_M$" represents a minimum controllable operating angle of said cylindrical roller.

11. The image forming apparatus according to claim 10, further comprising an operating angular position detector operable to detect an angular operating position of said cylindrical roller and to output, during each one rotation of said cylindrical roller, pulse signals whose number corresponds to 360° divided by said minimum controllable operating angle.

12. The image forming apparatus according to claim 1, further comprising:

a carriage carrying said recording head; and a carriage driver operable to move said carriage in a main scanning direction perpendicular to said feed direction, wherein said feed controller is operated to control said motor so as to intermittently move said feeder while said recording head forms the image on the medium, so as to position the medium in said desired recording position by each of successive feed motions of said feeder, and wherein said ink ejection controller is operated to cause said at least one ink ejection portion of said recording head to eject the ink therethrough while said carriage is being moved by said carriage driver in said main scanning direction after each of said successive feed motions of said feeder.

13. The image forming apparatus according to claim 1, further comprising a most-deviated-velocity operating-position obtainer operable, upon power-on of said image forming apparatus, to command said power supply controller to supply the power to said motor until said feeder is operated by an operating amount corresponding to at least one cycle of said cyclic variation, and to detect said operating velocity of said feeder in a plurality of operating positions of said feeder while said feeder is being operated by said operating amount, wherein said most-deviated-velocity operating-position obtainer obtains, based on the detected operating velocity in each of said plurality of operating positions, a most-deviated-velocity operating position of said feeder in which said operating velocity of said feeder is most deviated from a reference value thereof within each one cycle of said cyclic variation.

14. The feeding device according to claim 13, wherein said most-deviated-velocity operating-position obtainer commands said power supply controller to supply the power to said motor until said feeder is operated by an operating amount corresponding to at least two cycles of said cyclic variation, and detects said operating velocity of said feeder while said feeder is being operated by said operating amount, and wherein said most-deviated-velocity operating-position obtainer includes:

an operating-velocity-deviation-related data storage storing data representative of an amount of deviation of the detected operating velocity in each of said plurality of operating positions from an average value of the detected operating velocity as said reference value;

a reference signal wave generator operable to generate a plurality of reference signal waves represented by identical waveforms, such that positions of said reference signal waves relative to a reference operating position of said feeder are different from each other, each of said reference signal waves having (a) a cycle length equal to a cycle length of said cyclic variation and (b) at least one cycle each consisting of one positive region and one negative region; and a product-sum-computation-based obtainer operable to perform a product sum computation between each of said reference signal waves and the amounts of the deviations of the detected operating velocities in the respective operating positions overlapping with said each of said reference signal waves, and to determine one of said reference signal waves that provides a product sum largest among those provided by said reference signal waves, said product-sum-computation-based obtainer obtaining a distance of said most-deviated-velocity operating position from said reference operating position of said feeder, based on (i) the position of the determined one of said reference signal waves relative to said reference operating position of said feeder and (ii) a known position of said determined one of said reference signal waves relative to said most-deviated-velocity operating position.

15. The image forming apparatus according to claim 14, wherein said feed controller includes a cyclic-variation-related data storage storing data related to said cyclic variation of said operating velocity of said feeder, and wherein said most-deviated-velocity operating-position obtainer further includes a data provider providing said cyclic-variation-related data storage with data representative of said distance of said most-deviated-velocity operating position from said reference operating position of said feeder.

16. The image forming apparatus according to claim 1, wherein said feeder is a cylindrical roller which has a circular cross section and which is to be rotated by said motor for feeding the medium that is brought into frictional contact with said cylindrical roller, and wherein said target operating position represents an amount by which said cylindrical roller is to be rotated from a reference angular position of said cylindrical roller in a direction causing the medium to be fed in said feed direction.

17. A method of forming an image on a medium, by using a an image forming apparatus including: (a) a feed mechanism including a motor that is to be driven with supply of a power thereto, and a feeder that is to be moved by said motor for feeding a medium in a feed direction; (b) a recording head operable to eject an ink toward the medium so as to form an image on the medium; (c) a feed controller operable, upon reception of a command requesting the medium to be fed to a desired recording position, to control said motor so as to move said feeder to a target operating position that causes the medium to be positioned in said desired recording position; and (d) an ink ejection controller operable, upon positioning of the medium in said desired recording position, to cause at least one ink ejection portion of said recording head to eject the ink therethrough toward the medium, said method comprising:

changing said target operating position as an original target operating position to a modified target operating position in which influence of a cyclic variation of an operation velocity of said feeder upon the positioning of the medium is smaller than in said original target operating position, said cyclic variation being caused by a torque fluctuation of said feed mechanism; and shifting said at least one ink ejection portion in one of upstream and downstream directions in which said desired recording position is shifted as a result of change of said target operating position, for avoiding a position of said at least one ink ejection portion relative to the medium from being changed by the change of said target operating position.

18. The method according to claim 17, further comprising:

anticipating whether the medium fails to be accurately positioned in said desired recording position, by taking account of said target operating position of said feeder and said cyclic variation of an operating velocity of said feeder, wherein said original target operating position is changed to said modified target operating position, when failure of accurate positioning of the medium is anticipated.

19. The method according to claim 18, wherein the anticipating whether the medium fails to be accurately positioned in said desired recording position is performed based on a positional difference between said target operating position and a most-deviated-velocity operating position of said feeder in which said operating velocity of said feeder is most deviated from a reference value thereof within each one cycle of said cyclic variation.

* * * * *